United States Patent
Choi et al.

(10) Patent No.: US 10,085,263 B2
(45) Date of Patent: Sep. 25, 2018

(54) METHOD AND DEVICE FOR ALLOCATING RESOURCE UNITS USING LEFTOVER TONES IN WIRELESS LAN

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/524,037

(22) PCT Filed: Nov. 24, 2015

(86) PCT No.: PCT/KR2015/012671
§ 371 (c)(1),
(2) Date: May 3, 2017

(87) PCT Pub. No.: WO2016/085241
PCT Pub. Date: Jun. 2, 2016

(65) Prior Publication Data
US 2017/0359824 A1 Dec. 14, 2017

Related U.S. Application Data

(60) Provisional application No. 62/083,888, filed on Nov. 24, 2014, provisional application No. 62/083,320, (Continued)

(51) Int. Cl.
*H04J 3/24* (2006.01)
*H04W 72/04* (2009.01)
*H04W 84/12* (2009.01)

(52) U.S. Cl.
CPC ........ *H04W 72/0453* (2013.01); *H04W 84/12* (2013.01)

(58) Field of Classification Search
CPC ....... H04W 80/04; H04W 8/26; H04W 84/12; H04W 88/08; H04W 88/06; H04W 84/18;
(Continued)

(56) References Cited

U.S. PATENT DOCUMENTS 9,025,428 B2 * 5/2015 Jones, IV .............. H04L 5/0046
370/203
2011/0255620 A1 10/2011 Jones, IV et al.
(Continued)

OTHER PUBLICATIONS

Seok, "HEW PPDU Format for Supporting MIMO-OFDMA", IEEE 802.11-14/1210r1, Sep. 14, 2014, 18 pages.

*Primary Examiner* — Brenda H Pham
(74) *Attorney, Agent, or Firm* — Birch, Stewart, Kolasch & Birch, LLP

(57) ABSTRACT

Disclosed are a method and a device for allocating resource units using leftover tones in a wireless LAN. The method for allocating resource units using leftover tones in a wireless LAN may comprise the steps of: an AP generating PPDUs to be transmitted to a plurality of STAs; and the AP transmitting the PPDUs to the plurality of STAs on all frequency bands, wherein the PPDUs are transmitted from each of a plurality of resource unit sets respectively allocated to each of the plurality of STAs, wherein each of the plurality of resource unit sets includes a first resource unit set and a second resource unit set, wherein the first resource unit set includes at least one resource unit, the second resource unit set includes one tone design resource unit, and wherein the tone design resource unit may include at least one other resource unit and at least one additional tone unit.

10 Claims, 17 Drawing Sheets

Related U.S. Application Data filed on Nov. 24, 2014, provisional application No. 62/090,368, filed on Dec. 11, 2014, provisional application No. 62/091,638, filed on Dec. 15, 2014.

(58) Field of Classification Search
CPC ................. H04L 12/56; H04L 2012/56; H04L 2012/5608
USPC .... 370/349, 389, 310.2, 328, 338, 329, 341, 370/431, 443
See application file for complete search history.

(56) References Cited

U.S. PATENT DOCUMENTS

| | | | |
|---|---|---|---|
| 2012/0140753 A1* | 6/2012 | Lee ...................... | H04B 7/0636 370/338 |
| 2012/0327871 A1 | 12/2012 | Ghosh et al. | |
| 2013/0266086 A1 | 10/2013 | Yang et al. | |
| 2014/0169245 A1 | 6/2014 | Kenney et al. | |
| 2015/0381330 A1* | 12/2015 | Chen ...................... | H04L 5/0046 370/329 |
| 2016/0029397 A1* | 1/2016 | Chen ...................... | H04L 1/0057 370/329 |
| 2016/0057754 A1* | 2/2016 | Azizi .................... | H04W 28/20 370/329 |
| 2017/0230218 A1* | 8/2017 | Park .................... | H04L 27/2608 |

\* cited by examiner

FIG. 1
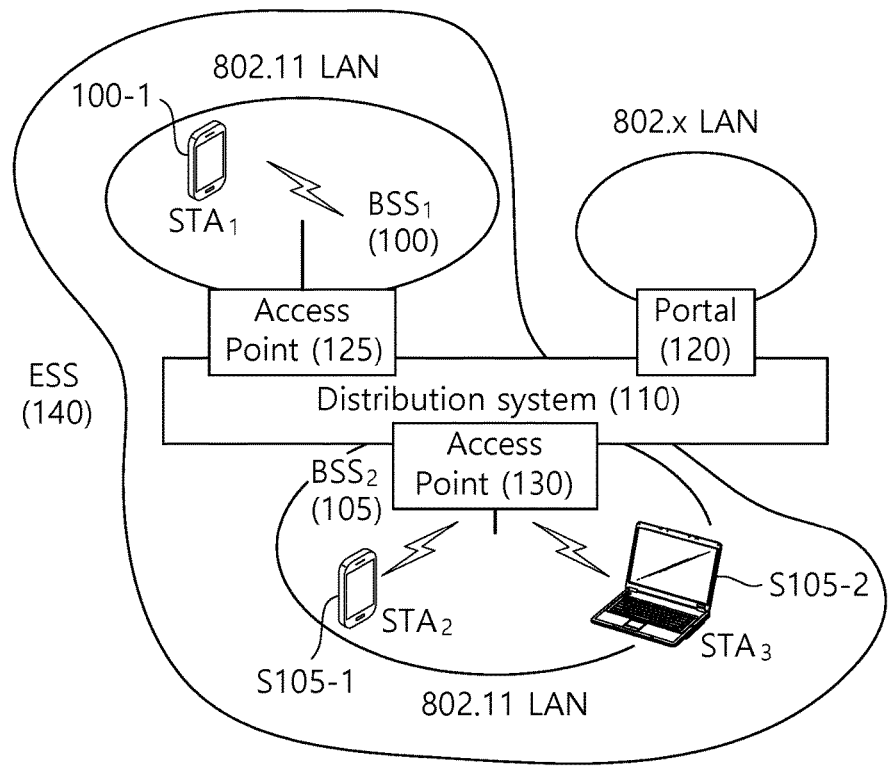
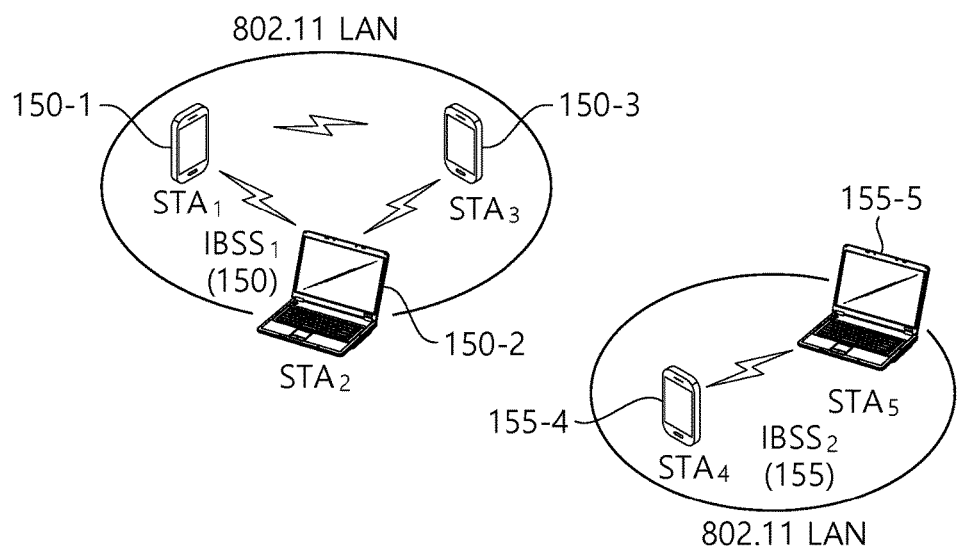

METHOD AND DEVICE FOR ALLOCATING RESOURCE UNITS USING LEFTOVER TONES IN WIRELESS LAN

CROSS REFERENCE TO RELATED APPLICATIONS

This application is the National Phase of PCT International Application No. PCT/KR2015/012671, filed on Nov. 24, 2015, which claims priority under 35 U.S.C. 119(e) to U.S. Provisional Application No. 62/083,320, filed on Nov. 24, 2014, 62/083,888, filed on Nov. 24, 2014, 62/090,368, filed on Dec. 11, 2014, and 62/091,638, filed on Dec. 15, 2014, all of which are hereby expressly incorporated by reference into the present application.

BACKGROUND OF THE INVENTION

Field of the Invention

The present invention relates to wireless communication and, most particularly, to a method and device for allocating resource units using leftover tones in a wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An object of the present invention is to provide a method for allocating resource units using leftover tones in a wireless LAN.

Another object of the present invention is to provide a device for allocating resource units using leftover tones in a wireless LAN.

Technical Solutions

In order to achieve the above-described technical object of the present invention, according to an aspect of the present invention, a method for allocating resource units using leftover tones in a wireless LAN may include the steps of generating, by an access point (AP), a PHY layer protocol data unit (PPDU) that is to be transmitted to a plurality of stations (STAs), and transmitting, by the AP, the PPDU to the plurality of STAs within an entire frequency bandwidth, wherein the PPDU may be transmitted from each of a plurality of resource unit groups being allocated to each of the plurality of STAs, wherein each of the plurality of resource unit groups may include a first resource unit group and a second resource unit group, wherein the first resource unit group may include at least one resource unit, wherein the second resource unit group may include one tone design resource unit, wherein the tone design resource unit may include at least one other resource unit and at least one additional tone unit, and wherein the at least one additional tone unit may include leftover tones remaining after allocating the at least one resource unit and the at least one other resource unit within the entire frequency band.

In order to achieve the above-described technical object of the present invention, according to another aspect of the present invention, an access point (AP) allocating resource units using leftover tones in a wireless LAN may include a radio frequency (RF) unit transmitting and receiving radio signals, and a processor being operatively connected to the RF unit, wherein the processor may be configured to generate a PHY layer protocol data unit (PPDU) that is to be transmitted to a plurality of stations (STAs), and to transmit the PPDU to the plurality of STAs within an entire frequency bandwidth, wherein the PPDU may be transmitted from each of a plurality of resource unit groups being allocated to each of the plurality of STAs, wherein each of the plurality of resource unit groups may include a first resource unit group and a second resource unit group, wherein the first resource unit group may include at least one resource unit, wherein the second resource unit group may include one tone design resource unit, wherein the tone design resource unit may include at least one other resource unit and at least one additional tone unit, and wherein the at least one additional tone unit may include leftover tones remaining after allocating the at least one resource unit and the at least one other resource unit within the entire frequency band.

Effects of the Invention

When allocating a wireless resource for each of a plurality of STAs based on orthogonal frequency division multiple access (OFDMA), resource allocation to each of the plurality of STAs may be performed by using wireless resource units each being defined to have a different size. By additionally using leftover tones that remain when allocating wireless resource units, wireless resource usage (or utilization) efficiency may be enhanced.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
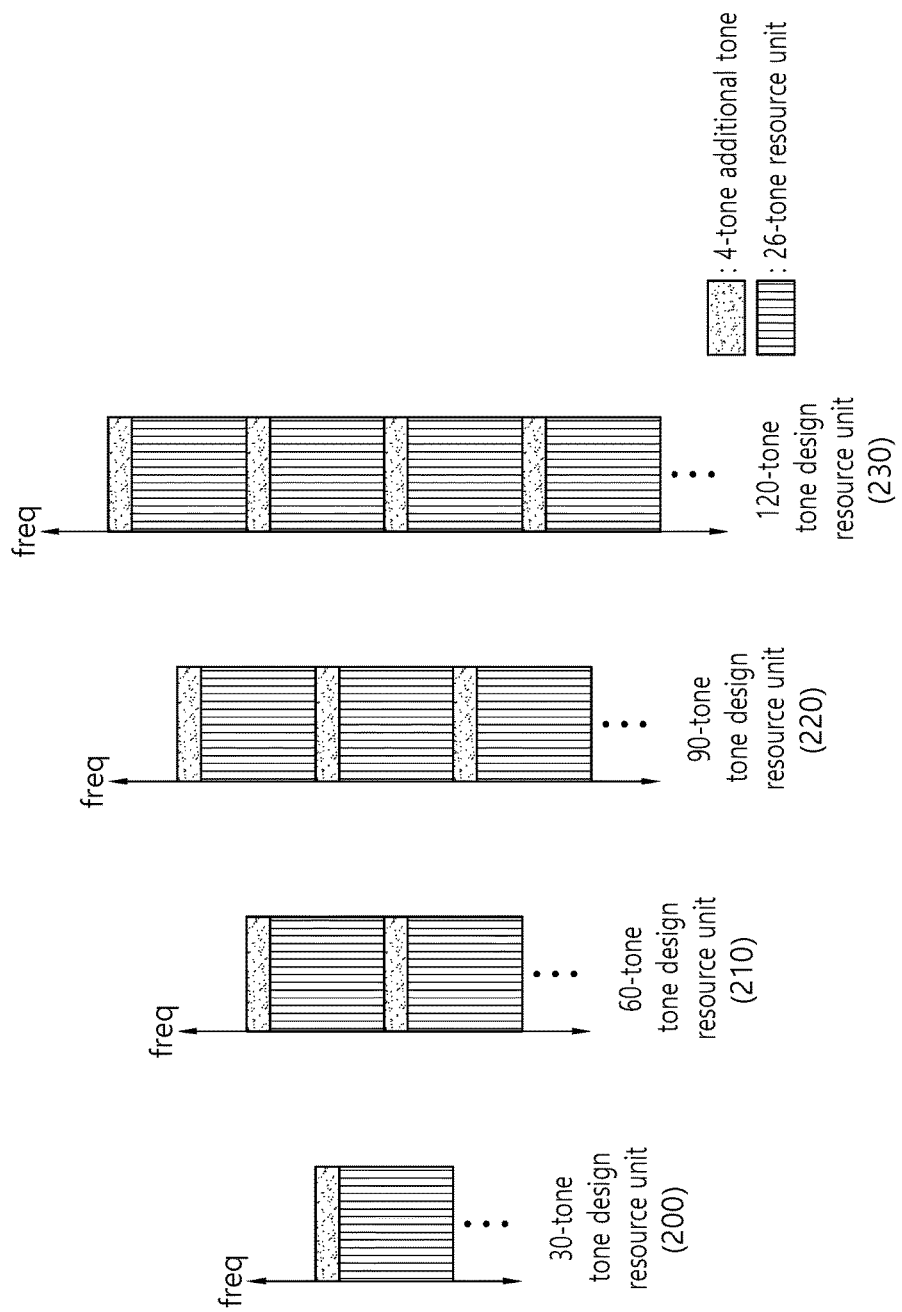
FIG. 2 is a conceptual view illustrating a tone design resource unit for resource allocation according to an exemplary embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a term called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the WirelessLAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared to the first part of the HE PPDU, the 4-times size of the FFT/IFFT may be applied to the second part of the HE PPDU. For example, 256 FFT/IFFT may be applied for a 20 MHz bandwidth, 512 FFT/IFFT may be applied for a 40 MHz bandwidth, 1024 FFT/IFFT may be applied for an 80 MHz bandwidth, and 2048 FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 μs and N=4, in the WirelessLAN system according to this exemplary embodiment, the IDFT/DFT length may be equal to 3.2 μs*4(=12.8 μs).

The length of an OFDM symbol may correspond to the IDFT/DFT length having a length of a guard interval (GI) added thereto. The length of the GI may have diverse values, such as 0.4 μs, 0.8 μs, 1.6 μs, 2.4 μs, and 3.2 μs.

An OFDMA structure for a 20 MHz bandwidth may be configured based on 26-tone units and 242-tone units. 256 subcarriers may be determined based on a 256 inverse fast fourier transform (IFFT) for the 20 MHz bandwidth. And, among the 256 subcarriers, 6 subcarriers may be used as a left guard tone, 3 subcarriers may be used as a DC tone, and 5 subcarriers may be used as a right guard tone. A subcarrier may be used in the same meaning as a tone. Among the 256 subcarriers, the remaining 242 tones that remain after excluding the left guard tone, the DC tone, and the right guard tone may be allocated by using OFDMA allocation. 26-tone resource units may be allocated within the remaining 242 tones. A maximum of 9 26-tone resource units may be allocated within the remaining 242 tones, and the remaining 8 tones may correspond to leftover tones. A maximum of 9 STAs may be supported for each of the maximum of 9 26-tone resource units. One STA may be allocated with 1 26-tone resource unit, 2 26-tone resource units, 3 26-tone resource units, or 4 26-tone resource units.

An OFDMA structure for a 40 MHz bandwidth may be configured based on 26-tone units and 242-tone units. 512 subcarriers may be determined based on a 512 IFFT for the 40 MHz bandwidth. And, among the 512 subcarriers, 12 subcarriers may be used as a left guard tone, 5 subcarriers may be used as a DC tone, and 11 subcarriers may be used as a right guard tone. A subcarrier may be used in the same meaning as a tone. Among the 512 subcarriers, the remaining 484 tones that remain after excluding the left guard tone, the DC tone, and the right guard tone may be allocated by using OFDMA allocation. 26-tone resource units and/or 242-tone resource units may be allocated within the remaining 484 tones. Based on 242-tone resource units, a maximum of 2 242-tone resource units may be allocated within the 484 tones, and, based on 24-tone resource units, a maximum of 26 resource units may be allocated within the 484 tones. In case 1 242-tone resource unit is allocated within the 484 tones, 9 26-tone resource units may be allocated within the remaining tones. One STA may be allocated with 1 26-tone resource unit, 2 26-tone resource units, 3 26-tone resource units, 4 26-tone resource units, or 1 242-tone resource unit.

An OFDMA structure for an 80 MHz bandwidth may be configured based on 26-tone units and 242-tone units. 1024 subcarriers may be determined based on a 1024 IFFT for the 80 MHz bandwidth. And, among the 1024 subcarriers, 12 subcarriers may be used as a left guard tone, 7 subcarriers may be used as a DC tone, and 11 subcarriers may be used as a right guard tone. A subcarrier may be used in the same meaning as a tone. Among the 1024 subcarriers, the remaining 994 tones that remain after excluding the left guard tone, the DC tone, and the right guard tone may be allocated by using OFDMA allocation. 26-tone resource units and/or 242-tone resource units may be allocated within the remaining 994 tones. Based on 242-tone resource units, a maximum of 4 242-tone resource units may be allocated within the 994 tones, and, based on 24-tone resource units, a maximum of 37 resource units may be allocated within the 994 tones. In case 2 242-tone resource units are allocated within the 994 tones, 19 26-tone resource units may be allocated within the remaining tones. And, in case 3 242-tone resource units are allocated within the 994 tones, 10 26-tone resource units may be allocated within the remaining tones. One STA may be allocated with 1 26-tone resource unit, 2 26-tone resource units, 3 26-tone resource units, 4 26-tone resource units, 1 242-tone resource unit, or 2 242-tone resource units.

Under the assumption presented above, a detailed resource allocation method according to an exemplary embodiment of the present invention will be disclosed.

FIG. 2 is a conceptual view illustrating a tone design resource unit for resource allocation according to an exemplary embodiment of the present invention.

FIG. 2 discloses a tone design method adding additional tones to 26-tone resource unit. According to the exemplary embodiment of the present invention, a tone design resource unit may be generated based on a tone design, wherein at least one 4-tone additional tone unit corresponding to a multiple of 4 tones is added to a combination of at least one 26-tone resource unit. In FIG. 2, the positions of the 26-tone resource unit configuring the tone design combination and the 4-tone additional tone unit are merely exemplary, and, therefore, the present invention will not be limited only to the example presented herein. Additionally, the resource unit that is expressed as a 26-tone resource unit may also have the same meaning as two 13-unit divided resource units.

A resource unit that is generated based on a tone design, wherein one additional tone unit (e.g., 4 tones) is added to one resource unit having a predetermined size corresponding to a specific size (e.g., 26-tone resource unit) may also be expressed by using the term tone design resource unit. Unlike the general resource unit, a tone design resource unit may correspond to a non-extendible resource unit. More specifically, a 30-tone tone design resource unit, which is configured by adding a 4-tone additional tone unit to a 26-tone resource unit, cannot be used for the resource allocation of nx30 tones on the frequency axis. The tone design resource unit may be allocated to an STA in a predetermined (or fixed) position within the frequency axis. Only a numerology corresponding to the number of tones included in the tone design resource unit may be used for the tone design resource unit. For example, a numerology corresponding to 30 tones may be used for the 30-tone tone design resource unit.

According to the exemplary embodiment of the present invention, the number of additional tone units being added to the tone design resource unit may vary in accordance with the number of 26-tone resource units configuring the tone design resource unit. For example, the number of additional tone units that are to be linearly added to the tone design resource unit may be linearly increased in accordance with the number of 26-tone resource units configuring the tone design resource unit.

Referring to FIG. 2, the number of 4-tone additional tone units being added for the configuration of the tone design resource unit may vary in accordance with the number of 26-tone resource units configuring the tone design resource unit.

More specifically, in case the number of 26-tone resource units configuring the tone design resource unit is equal to 1, one (1) 4-tone additional tone unit may be used so as to define a 30-tone design resource unit 200. 26-tone resource units and/or 242-tone resource units may be allocated within remaining frequency resources that remain after excluding the frequency resources that are allocated to the 30-tone tone design resource unit 200.

In case the number of 26-tone resource units configuring the tone design resource unit is equal to 2, two (2) 4-tone additional tone units may be used so as to define a 60-tone design resource unit (2×26 tones+2×4 tones=60 tones) 210. 26-tone resource units and/or 242-tone resource units may be allocated within remaining frequency resources that remain after excluding the frequency resources that are allocated to the 60-tone tone design resource unit 210.

In case the number of 26-tone resource units configuring the tone design resource unit is equal to 3, three (3) 4-tone additional tone units may be used so as to define a 90-tone design resource unit (3×26 tones+3×4 tones=90 tones) 220. The 90-tone tone design resource unit 220 may be defined when a leftover tone having a size of 8 tones or more exist within the 40 MHz bandwidth or 80 MHz bandwidth. 26-tone resource units and/or 242-tone resource units may be allocated within remaining frequency resources that remain after excluding the frequency resources that are allocated to the 90-tone tone design resource unit 220.

In case the number of 26-tone resource units configuring the tone design resource unit is equal to 4, four (4) 4-tone additional tone units may be used so as to define a 120-tone design resource unit (4×26 tones+4×4 tones=120 tones) 230. The 120-tone tone design resource unit 230 may be defined when a leftover tone having a size of 8 tones or more exist within the 40 MHz bandwidth or 80 MHz bandwidth. 26-tone resource units and/or 242-tone resource units may be allocated within remaining frequency resources that remain after excluding the frequency resources that are allocated to the 120-tone tone design resource unit 230.

Figure 3:
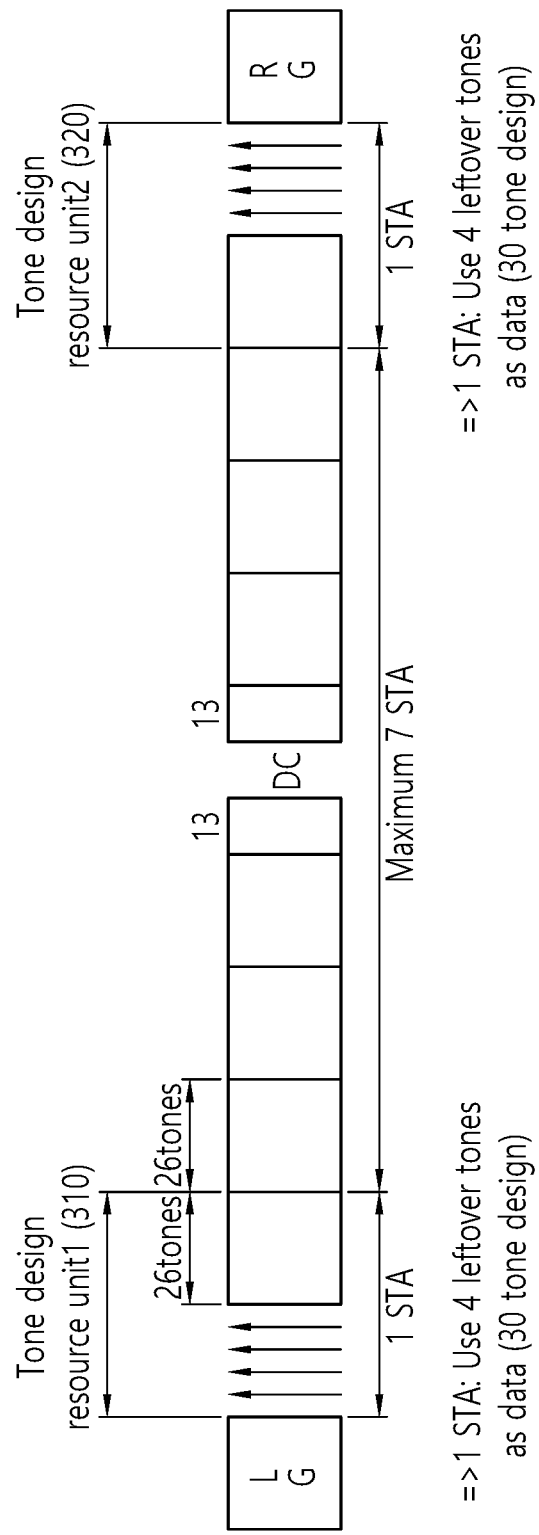
FIG. 3 is a conceptual view illustrating a resource allocation method according to an exemplary embodiment of the present invention.

FIG. 3 is a conceptual view illustrating a resource allocation method according to an exemplary embodiment of the present invention.

FIG. 3 discloses a case when 2 30-tone design resource units and 7 26-tone resource units are allocated to a 20 MHz bandwidth.

Referring to FIG. 3, each of the 2 30-tone tone design resource units may be respectively positioned to be adjacent to each of the left guard tone and the right guard tone. 30-tone tone design resource unit 1 310 may be configured of a 4-tone additional tone unit and a 26-tone resource unit that are adjacent to the left guard tone. 30-tone tone design resource unit 2 320 may be configured of a 4-tone additional tone unit and a 26-tone resource unit that are adjacent to the right guard tone.

Among the 7 26-tone resource units, one 26-tone resource unit that is located at the center may be divided based on the DC tone, thereby being divided into 2 13-tone divided resource units and respectively allocated.

In the 20 MHz bandwidth, a left guard tone, 30-tone tone design resource unit 1 310, 3 26-tone resource units, 1 13-tone divided resource unit, a DC tone, 1 13-tone divided resource unit, 3 26-tone resource units, 30-tone tone design resource unit 2 320, and a right guard tone may be sequentially allocated.

FIG. 3 discloses a case when a 30-tone design resource unit being configured of a 26-tone resource unit and a 4-tone additional tone unit are used for a 20 MHz bandwidth (or for one 242-tone chunk). The 242-tone chunk may have the same meaning as a resource unit included 242 tones. The number of tones being used may be equal to 7×26-tone resource units+2×30-tone tone design resource units=242 tones, and no leftover lone may remain. The maximum number of STAs that can be supported within the 20 MHz bandwidth may be equal to 9 users. For the 40 MHz bandwidth and the 80 MHz bandwidth, this may be extended and applied by 242-tone chunk units.

By using additional leftover tones as data tones for data transmission through a resource allocation that is based on the above-described tone design, wireless resource usage (or utilization) efficiency may be increased.

Figure 4:
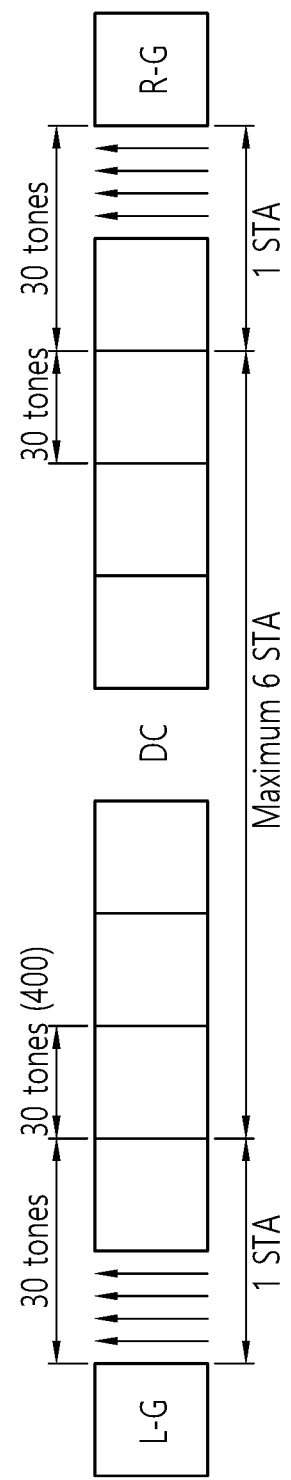
FIG. 4 is a conceptual view illustrating a resource allocation method according to an exemplary embodiment of the present invention.

FIG. 4 is a conceptual view illustrating a resource allocation method according to an exemplary embodiment of the present invention.

FIG. 4 discloses a method of defining a 30-tone tone design resource unit by adding additional tones to the 26-tone resource unit. A plurality of 30-tone resource units may be allocated within the bandwidth. Although the 20 MHz bandwidth is disclosed in FIG. 4 merely as an example, the 30-tone resource unit may also be used for the resource allocation in the 40 MHz bandwidth and the 80 MHz bandwidth. In case the 30-tone resource unit is defined, unlike the tone design resource unit, this may correspond to a unit that can be extended (i.e., a unit that is extendible).

Referring to FIG. 4, 8 30-tone resource units 400 may be allocated within the 20 MHz bandwidth. In this case, among the total 242 tones, 8 30-tone resource units may be allocated to 240 tones and the remaining 2 tones may correspond to leftover tones. In case the resource allocation is performed based on the 30-tone resource unit 400, the 26-tone resource unit may not be allocated within the corresponding bandwidth. In case of using a resource allocation that is based on the 30-tone resource unit 400, resource allocation for a maximum of 8 STAs may be performed within the 242-tone chunk.

Figure 5:
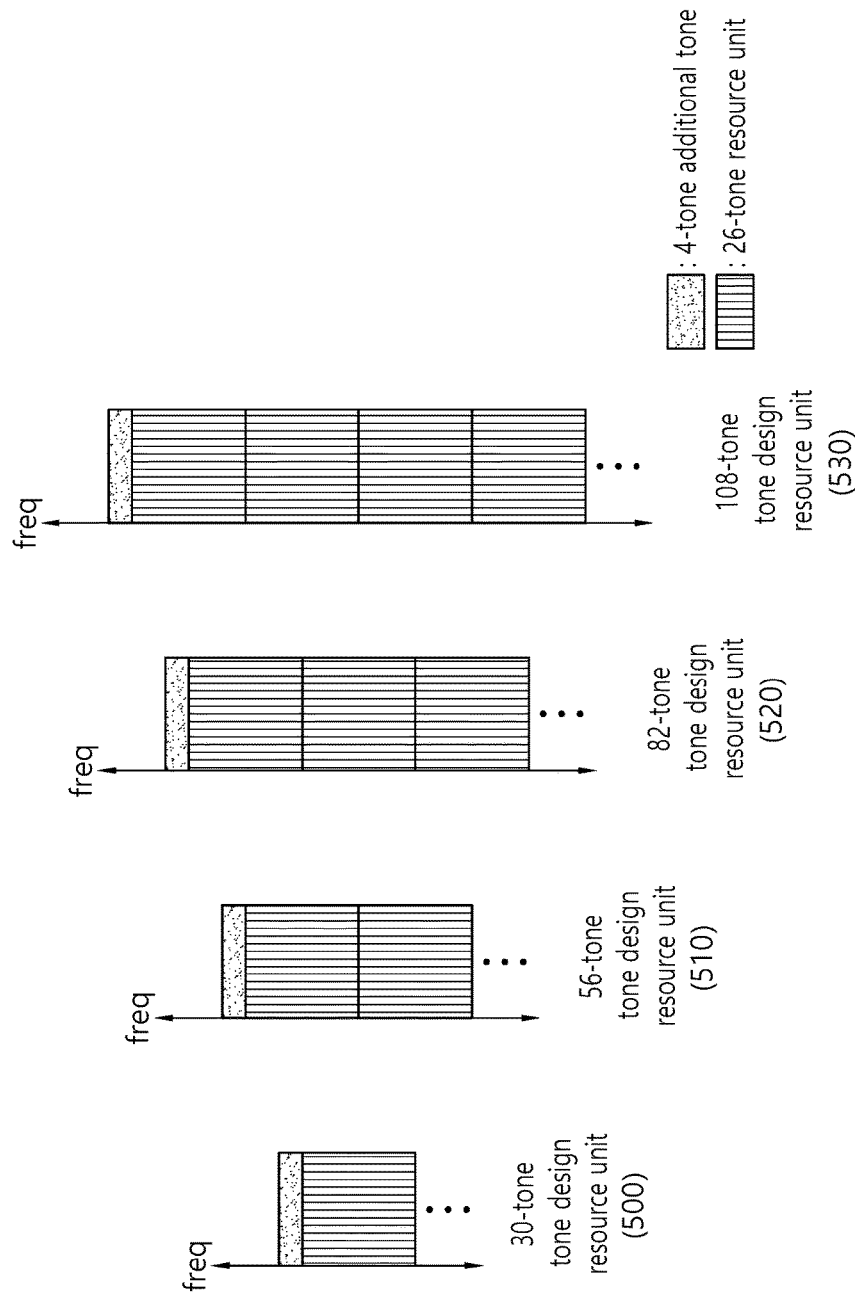
FIG. 5 is a conceptual view illustrating a tone design resource unit for resource allocation according to an exemplary embodiment of the present invention.

FIG. 5 is a conceptual view illustrating a tone design resource unit for resource allocation according to an exemplary embodiment of the present invention.

FIG. 5 discloses a tone design resource unit that is configured of a combination of 26-tone resource units. In FIG. 5, the positions of the 26-tone resource unit configuring the tone design combination and the 4-tone additional tone unit are merely exemplary, and, therefore, the present invention will not be limited only to the example presented herein. Additionally, the resource unit that is expressed as a 26-tone resource unit may also have the same meaning as two 13-unit divided resource units.

Basically, a resource unit, which is configured of a combination of at least one 26-tone resource unit and at least one 4-tone additional tone unit, may be defined as a tone design resource unit and not as a general resource unit that can be allocated by a multiple based allocation (or multiplication based allocation). The size corresponding to 26 tones is merely an exemplary size, and the size corresponding to 4 tones is an exemplary size for an additional tone unit. And, therefore, the tone design resource unit may be configured based on a combination of resource units having diverse sizes and additional tone units having diverse sizes. As described above, unlike the general resource unit, a tone design resource unit may correspond to a non-extendible resource unit.

According to the exemplary embodiment of the present invention, the number of additional tone unit being added to the tone design resource unit may be determined independently from the number of 26-unit resource units configuring the tone design resource unit. For example, one 4-tone additional tone unit may be independently added to the tone design resource unit without considering the number of 26-tone resource units configuring the tone design resource unit.

Referring to FIG. 5, the number of 4-tone additional tone units that are independently added for the configuration of the tone design resource unit regardless of the number of 26-tone resource units configuring the tone design resource unit may correspond to a fixed value.

More specifically, in case the number of 26-tone resource units configuring the tone design resource unit is equal to 1, 1 4-tone additional tone unit may be used so as to define a 30-tone tone design resource unit 500. The 8 leftover tones within the bandwidth may be defined as 2 4-tone additional tone units, and each of the two 4-tone additional tone units may be respectively combined with each of two 26-tone resource units, thereby allocating two 30-tone tone design resource units 500 within the 20 MHz bandwidth. 26-tone resource units and/or 242-tone resource units may be allocated within the remaining frequency resources.

In case the number of 26-tone resource units configuring the tone design resource unit is equal to 2, 1 4-tone additional tone unit may be used so as to define a 56-tone tone design resource unit (2×26 tones+1×4 tones=56 tones) 510. The 8 leftover tones within the bandwidth may be defined as 2 4-tone additional tone units (first 4-tone additional tone unit and second 4-tone additional tone unit). A first 4-tone additional tone unit may configure a first 56-tone tone design resource unit along with two 26-tone resource units, and a second 4-tone additional tone unit may configure a second 56-tone tone design resource unit along with another two 26-tone resource units. 26-tone resource units and/or 242-tone resource units may be allocated within the remaining frequency resources.

In case the number of 26-tone resource units configuring the tone design resource unit is equal to 3, 1 4-tone additional tone unit may be used so as to define an 82-tone tone design resource unit (3×26 tones+1×4 tones=82 tones) 520. The 8 leftover tones within the bandwidth may be defined as 2 4-tone additional tone units (first 4-tone additional tone unit and second 4-tone additional tone unit). A first 4-tone additional tone unit may configure a first 82-tone tone design resource unit along with three 26-tone resource units, and a second 4-tone additional tone unit may configure a second 82-tone tone design resource unit along with another three 26-tone resource units. 26-tone resource units and/or 242-tone resource units may be allocated within the remaining frequency resources.

In case the number of 26-tone resource units configuring the tone design resource unit is equal to 4, 1 4-tone additional tone unit may be used so as to define a 108-tone tone design resource unit (4×26 tones+1×4 tones=108 tones) 530. The 8 leftover tones within the bandwidth may be defined as 2 4-tone additional tone units (first 4-tone additional tone unit and second 4-tone additional tone unit). A first 4-tone additional tone unit may configure a first 108-tone tone design resource unit along with four 26-tone resource units, and a second 4-tone additional tone unit may configure a second 108-tone tone design resource unit along with another four 26-tone resource units. 26-tone resource units and/or 242-tone resource units may be allocated within the remaining frequency resources.

Figure 6:
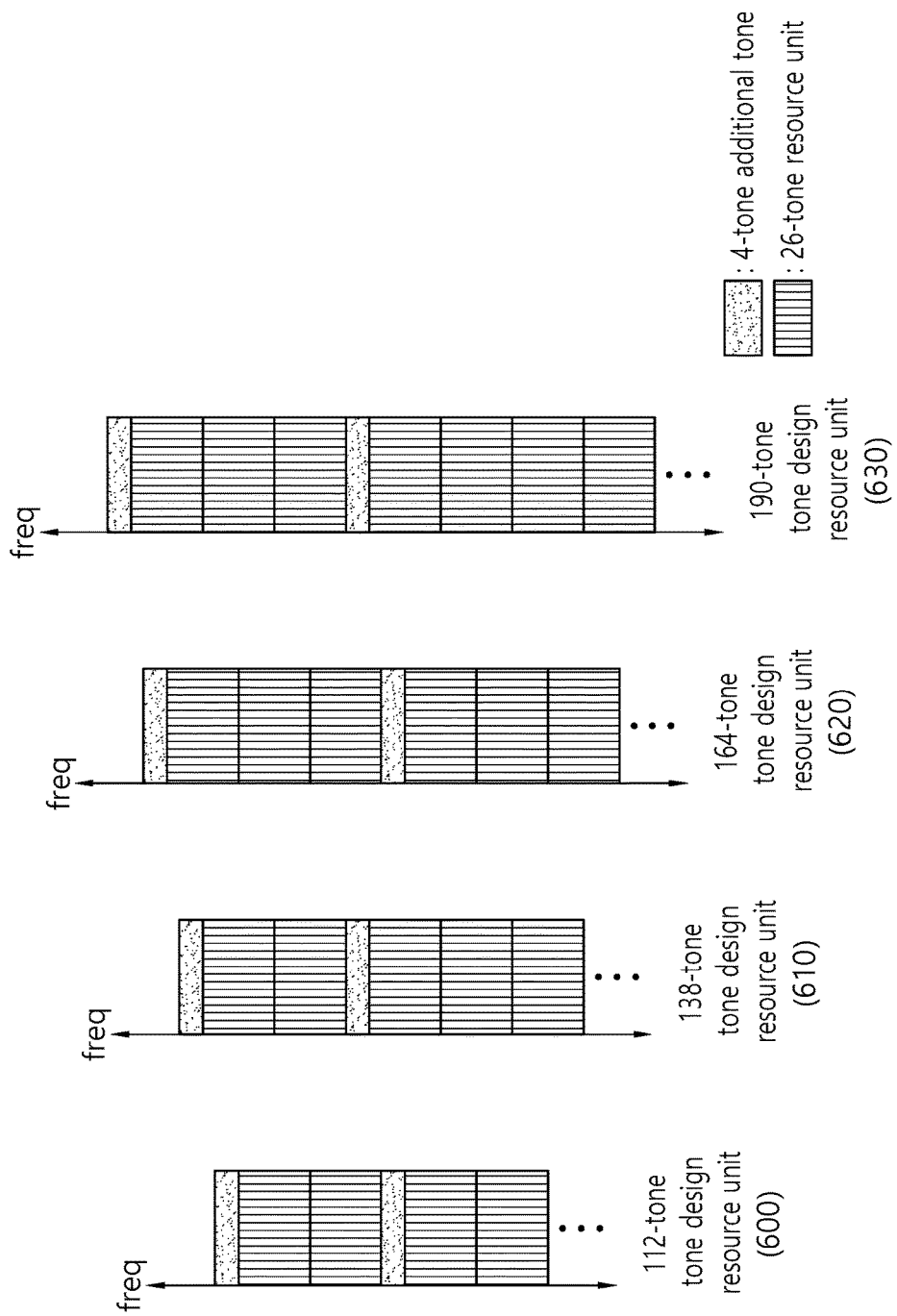
FIG. 6 is a conceptual view illustrating a tone design resource unit for resource allocation according to an exemplary embodiment of the present invention.

FIG. 6 is a conceptual view illustrating a tone design resource unit for resource allocation according to an exemplary embodiment of the present invention.

FIG. 6 discloses a tone design resource unit that is configured by a combination of 4 or more 26-tone resource units. In FIG. 6, the positions of the 26-tone resource unit configuring the tone design combination and the 4-tone additional tone unit are merely exemplary, and, therefore, the present invention will not be limited only to the example presented herein. Additionally, the resource unit that is expressed as a 26-tone resource unit may also have the same meaning as two 13-unit divided resource units.

Referring to FIG. 6, in case the number of 26-tone resource units configuring the tone design resource unit is equal to 4, 2 4-tone additional tone unit may be used so as to define a 112-tone tone design resource unit (4×26 tones+2×4 tones=112 tones) 600. 26-tone resource units and/or 242-tone resource units may be allocated within the remaining frequency resources.

In case the number of 26-tone resource units configuring the tone design resource unit is equal to 5, 2 4-tone additional tone unit may be used so as to define a 138-tone tone design resource unit (5×26 tones+2×4 tones=138 tones) 610. 26-tone resource units and/or 242-tone resource units may be allocated within the remaining frequency resources.

In case the number of 26-tone resource units configuring the tone design resource unit is equal to 6, 2 4-tone additional tone unit may be used so as to define a 164-tone tone design resource unit (6×26 tones+2×4 tones=164 tones) 620. 26-tone resource units and/or 242-tone resource units may be allocated within the remaining frequency resources.

In case the number of 26-tone resource units configuring the tone design resource unit is equal to 7, 2 4-tone additional tone unit may be used so as to define a 190-tone tone design resource unit (7×26 tones+2×4 tones=190 tones) 630. 26-tone resource units and/or 242-tone resource units may be allocated within the remaining frequency resources.

In case the number of 26-tone resource units configuring the tone design resource unit is equal to 8, 2 4-tone additional tone unit may be used so as to define a 216-tone tone design resource unit (8×26 tones+2×4 tones=216 tones) (not shown). 26-tone resource units and/or 242-tone resource units may be allocated within the remaining frequency resources.

In case the number of 26-tone resource units configuring the tone design resource unit is equal to 9, 2 4-tone additional tone unit may be used so as to define a 242-tone tone design resource unit (9×26 tones+2×4 tones=242 tones) (not shown). 26-tone resource units and/or 242-tone resource units may be allocated within the remaining frequency resources.

An OFDMA based resource allocation may be performed to a 242 chunk. For example, a 242 chunk may be configured of a 242-tone resource unit or 9 26-tone resource units. In case 9 26-tone units are allocated to 234 tones within the 242 chunk, a leftover tone having the size of 8 tones may remain. The leftover tones corresponding to 8 tones may be combined with the resource units, as described above, thereby being used as a data tone and/or pilot tone.

Hereinafter, additional tone design resource units using the leftover tones and a resource allocation method that is based on the tone design resource unit will be disclosed.

Figure 7:
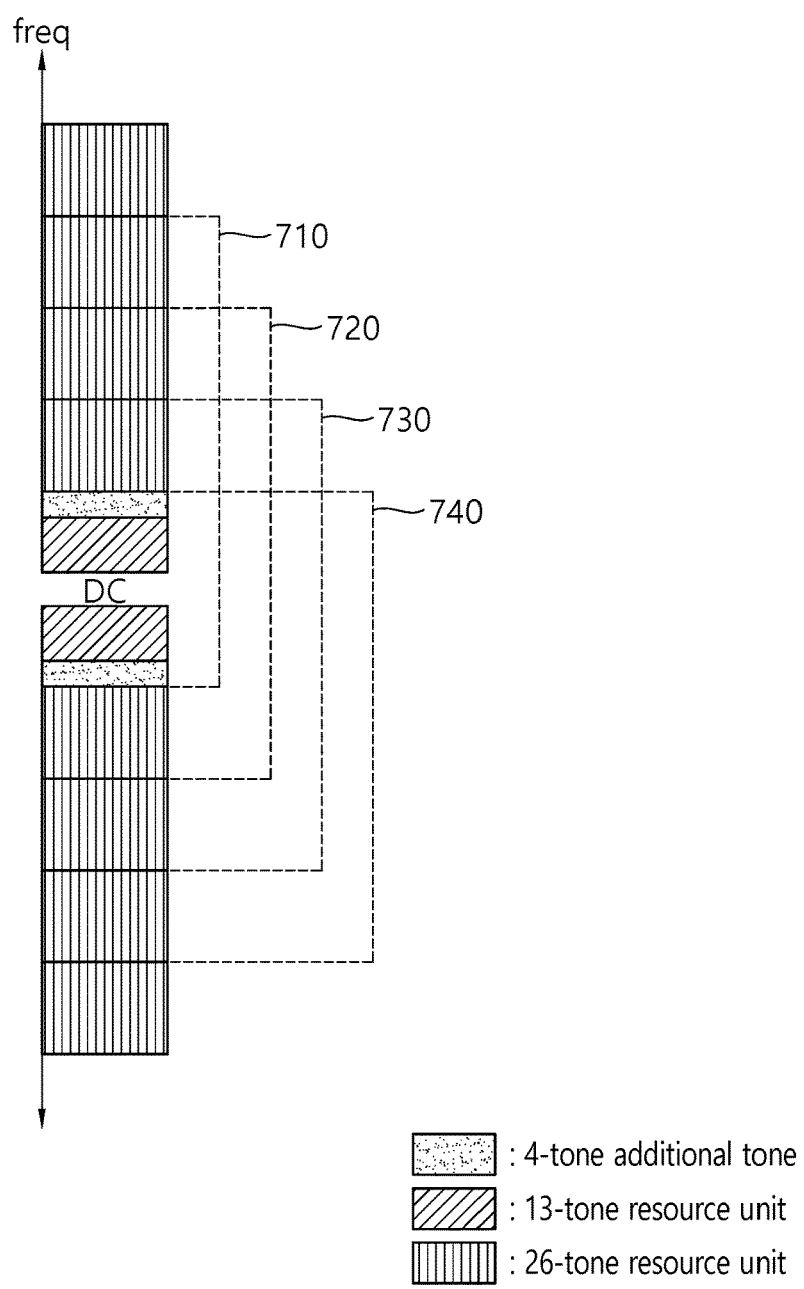
FIG. 7 is a conceptual view illustrating a resource allocation method according to an exemplary embodiment of the present invention.

FIG. 7 is a conceptual view illustrating a resource allocation method according to an exemplary embodiment of the present invention.

FIG. 7 discloses a resource allocation method that is based on a 112-tone tone design resource unit, which is configured of 4 26-tone resource units and 2 4-tone additional tone units (8 leftover tones).

In case the 4-tone additional tone units are allocated to be adjacent to 26-tone resource units that are adjacent to the DC tone, the possible resource allocation method will hereinafter be disclosed.

Referring to FIG. 7, a left guard tone, 4 26-tone resource units, a 4-tone first additional tone unit, a 13-tone divided resource unit, a DC tone, a 13-tone divided resource unit, a 4-tone second additional tone unit, 4 26-tone resource units, and a right guard tone may be allocated within the 20 MHz bandwidth.

According to the exemplary embodiment of the present invention, a 112-tone tone design resource unit, which is configured of 4 26-tone resource unit and 2 4-tone additional tone units (a 4-tone first additional tone unit and a 4-tone second additional tone unit), may be defined.

The 112-tone tone design resource unit may be allocated to one allocatable location available for allocating the tone design resource unit among a plurality of allocatable locations available for allocating the tone design resource unit, which are defined based on the 2 4-tone additional tone units.

For example, a first allocatable location 710 available for allocating the tone design resource unit may correspond to the allocation locations of 3 26-tone resource units, the 4-tone first additional tone unit, 2 13-tone divided resource units, and the 4-tone second additional tone unit, which are sequentially allocated based on the left guard tone.

A second allocatable location 720 available for allocating the tone design resource unit may correspond to the allocation locations of 2 26-tone resource units, the 4-tone first additional tone unit, 2 13-tone divided resource units, the 4-tone second additional tone unit, and 1 26-tone resource unit, which are sequentially allocated based on the left guard tone.

A third allocatable location 730 available for allocating the tone design resource unit may correspond to the allocation locations of 1 26-tone resource unit, the 4-tone first additional tone unit, 2 13-tone divided resource units, the 4-tone second additional tone unit, and 2 26-tone resource units, which are sequentially allocated based on the left guard tone.

A fourth allocatable location 740 available for allocating the tone design resource unit may correspond to the allocation locations of the 4-tone first additional tone unit, 2 13-tone divided resource units, the 4-tone second additional tone unit, and 3 26-tone resource units, which are sequentially allocated based on the left guard tone.

In case the 112-tone tone design resource unit corresponds to one allocatable location available for the resource allocation of the tone design resource unit, among the plurality of allocatable locations available for the resource allocation of the tone design resource unit, a subband selective transmission may be performed. More specifically, the tone design resource unit may be allocated to one allocatable location available for the resource allocation of the tone design resource unit, among the plurality of allocatable locations available for the resource allocation of the tone design resource unit, in accordance with the channel status.

Table 1 shown below discloses the allocation of resource units in accordance with the number of STAs that are allocated with resource units within the frequency axis.

TABLE 1

| Allocation case | K (17 set) | 1x26 | 2x26 | 3x26 | 4x26 + 8 ~~4x26~~ |
|---|---|---|---|---|---|
| 1 | 3 | 0 | 0 | 3 | 0 |
| 2 | 3 | 0 | 1 | 1 | 1 |
| ~~3~~ | ~~3~~ | ~~1~~ | ~~0~~ | ~~0~~ | ~~2~~ |
| 4 | 4 | 0 | 3 | 1 | 0 |
| 5 | 4 | 1 | 1 | 2 | 0 |
| 6 | 4 | 1 | 2 | 0 | 1 |
| 7 | 4 | 2 | 0 | 1 | 1 |
| 8 | 5 | 1 | 4 | 0 | 0 |
| 9 | 5 | 2 | 2 | 1 | 0 |
| 10 | 5 | 3 | 0 | 2 | 0 |
| 11 | 5 | 3 | 1 | 0 | 1 |
| 12 | 6 | 3 | 3 | 0 | 0 |
| 13 | 6 | 4 | 1 | 1 | 0 |
| 14 | 6 | 5 | 0 | 0 | 1 |

TABLE 1-continued

| Allocation case | K (17 set) | 1x26 | 2x26 | 3x26 | 4x26 + 8 ~~4x26~~ |
|---|---|---|---|---|---|
| 15 | 7 | 5 | 2 | 0 | 0 |
| 16 | 7 | 6 | 0 | 1 | 0 |
| 17 | 8 | 7 | 1 | 0 | 0 |
| 18 | 9 | 9 | 0 | 0 | 0 |

In Table 1, a case when 9 26-tone resource units are allocated within the 20 MHz bandwidth will be assumed.

Referring to Table 1, one STA may be allocated with a first resource unit group including 1 26-tone resource unit, a second resource unit group including 2 26-tone resource units, a third resource unit group including 3 26-tone resource units, or a fourth resource unit group including a 112-tone tone design resource unit, which is configured of 4 26-tone resource units and 2 4-tone additional tone units (8 leftover tones).

For example, a first allocation case corresponds to a case when each of 3 STAs is respectively allocated with each of 3 third resource unit groups. More specifically, STA1 may be allocated with 3 26-tone resource units, STA2 may be allocated with 3 26-tone resource units, and STA3 may be allocated with 3 26-tone resource units.

A third allocation case shows an exemplary case when resource allocation is not possible. Since only one 112-tone tone design resource unit can be allocated within the frequency axis, the resource allocation shown in the third allocation case cannot be performed. Also, resource allocation that is based only on at least one specific resource unit group may not be possible (or may not be performed) in a specific allocation case.

The definition of the allocation of a new interleaver/new pilot for the 112-tone tone design resource unit may be required. The 112-tone tone design resource unit may be usefully used in a 10 MHz bandwidth.

According to the exemplary embodiment of the present invention, the location of the 4-tone additional tone unit may change (or vary).

According to another exemplary embodiment of the present invention, with the change (or variation) in the location of the 4-tone additional tone unit, resource allocation that is based on a left guard tone, [26, 26, 26, 4, 26, 26, 26, 4, 26, 26, 26], and a right guard tone may be performed. In this case, the 112-tone tone design resource unit may be allocated to the locations of the resource allocation units in parentheses (or brackets), such as [26, 26, (26, 4, 26, 26, 26, 4), 26, 26, 26] and [26, 26, 26, (4, 26, 26, 26, 4), 26, 26, 26], and the 4-tone additional tone unit.

Figure 8:
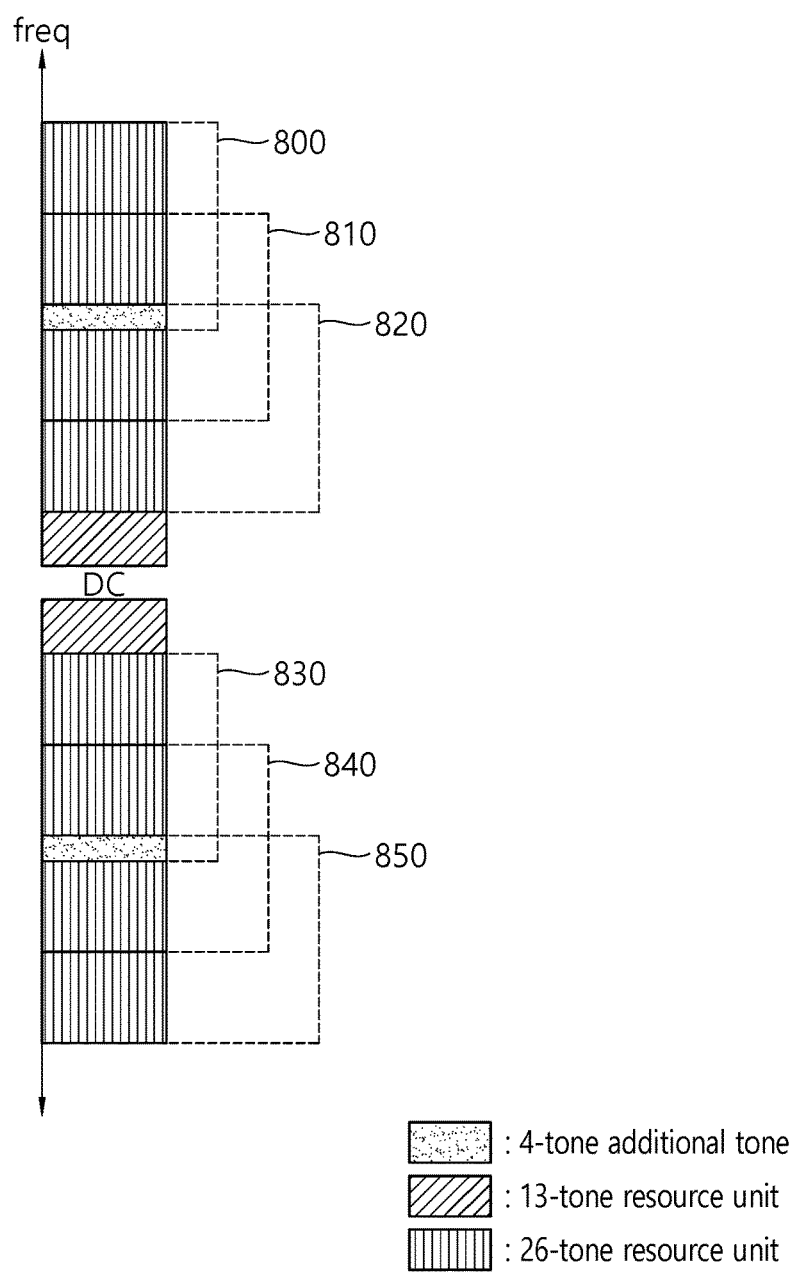
FIG. 8 is a conceptual view illustrating a resource allocation method according to an exemplary embodiment of the present invention.

FIG. 8 is a conceptual view illustrating a resource allocation method according to an exemplary embodiment of the present invention.

FIG. 8 discloses a resource allocation method that is based on a 56-tone tone design resource unit, which is configured of 2 26-tone resource units and 1 4-tone additional tone unit (4 leftover tones).

Referring to FIG. 8, a left guard tone, 2 26-tone resource units, a 4-tone first additional tone unit, 2 26-tone resource units, a 13-tone divided resource unit, a DC tone, a 13-tone divided resource unit, 2 26-tone resource units, a 4-tone second additional tone unit, 2 26-tone resource units, and a right guard tone may be allocated within the 20 MHz bandwidth.

According to the exemplary embodiment of the present invention, a 56-tone tone design resource unit, which is configured of 2 26-tone resource units and 1 4-tone additional tone unit, may be defined.

The 1 12-tone tone design resource unit may be allocated to one allocatable location available for allocating the tone design resource unit among a plurality of allocatable locations available for allocating the tone design resource unit, which are defined based on the 4-tone first additional tone unit or the 4-tone second additional tone unit.

For example, a first allocatable location 800 available for allocating the tone design resource unit may correspond to the allocation locations of 2 26-tone resource units and the 4-tone first additional tone unit, which are sequentially allocated based on the left guard tone.

A second allocatable location 810 available for allocating the tone design resource unit may correspond to the allocation locations of 1 26-tone resource unit, the 4-tone first additional tone unit, and 1 26-tone resource unit, which are sequentially allocated based on the left guard tone.

A third allocatable location 820 available for allocating the tone design resource unit may correspond to the allocation locations of the 4-tone first additional tone unit and 2 26-tone resource units, which are sequentially allocated based on the left guard tone.

A fourth allocatable location 830 available for allocating the tone design resource unit may correspond to the allocation locations of 2 26-tone resource units and the 4-tone second additional tone unit, which are sequentially allocated based on the left guard tone.

A fifth allocatable location 840 available for allocating the tone design resource unit may correspond to the allocation locations of 1 26-tone resource unit, the 4-tone second additional tone unit, and 1 26-tone resource unit, which are sequentially allocated based on the left guard tone.

A sixth allocatable location 850 available for allocating the tone design resource unit may correspond to the allocation locations of the 4-tone second additional tone unit and 2 26-tone resource units, which are sequentially allocated based on the left guard tone.

Similarly, in case the 56-tone tone design resource unit corresponds to one allocatable location available for the resource allocation of the tone design resource unit, among the plurality of allocatable locations available for the resource allocation of the tone design resource unit, a subband selective transmission may be performed. More specifically, the tone design resource unit may be allocated to one allocatable location available for the resource allocation of the tone design resource unit, among the plurality of allocatable locations available for the resource allocation of the tone design resource unit, in accordance with the channel status.

Table 2 shown below discloses the allocation of resource units in accordance with the number of STAs that are allocated with resource units within the frequency axis.

TABLE 2

| Allocation Case | K (15 set) | 1x26 | 2x26 + 4 2x26 | 3x26 | 4x26 |
|---|---|---|---|---|---|
| 1 | 3 | 0 | 0 | 3 | 0 |
| 2 | 3 | 0 | 1 | 1 | 1 |
| 3 | 3 | 1 | 0 | 0 | 2 |
| 4 | 4 | 0 | 3 | 1 | 0 |
| 5 | 4 | 1 | 1 | 2 | 0 |
| 6 | 4 | 1 | 2 | 0 | 1 |
| 7 | 4 | 2 | 0 | 1 | 1 |
| 8 | 5 | 1 | 4 | 0 | 0 |
| 9 | 5 | 2 | 2 | 1 | 0 |

TABLE 2-continued

| Allocation Case | K (15 set) | 1x26 | 2x26 + 4 2x26 | 3x26 | 4x26 |
|---|---|---|---|---|---|
| 10 | 5 | 3 | 0 | 2 | 0 |
| 11 | 5 | 3 | 1 | 0 | 1 |
| 12 | 6 | 3 | 3 | 0 | 0 |
| 13 | 6 | 4 | 1 | 1 | 0 |
| 14 | 6 | 5 | 0 | 0 | 1 |
| 15 | 7 | 5 | 2 | 0 | 0 |
| 16 | 7 | 6 | 0 | 1 | 0 |
| 17 | 8 | 7 | 1 | 0 | 0 |
| 18 | 9 | 9 | 0 | 0 | 0 |

In Table 2, a case when 9 26-tone resource units are allocated within the 20 MHz bandwidth will be assumed.

Referring to Table 2, one STA may be allocated with a first resource unit group including 1 26-tone resource unit, a second resource unit group including a tone design resource unit, which is configured of 2 26-tone resource units and 1 4-tone additional tone unit, a third resource unit group including 3 26-tone resource units, or a fourth resource unit group including 4 26-tone resource units.

For example, a second allocation case corresponds to a case when each of 3 STAs is respectively allocated with the second resource unit group, the third resource unit group, and the fourth resource unit group. More specifically, STA1 may be allocated with the second resource unit group, STA2 may be allocated with the third resource unit group, and STA3 may be allocated with the fourth resource unit group.

A fourth allocation case/eighth allocation case/twelfth allocation case respectively show exemplary cases when resource allocation is not possible. Since the total number of leftover tones within the 20 MHz bandwidth is equal to 8 tones, and since up to 2 second resource unit groups can be allocated, the fourth allocation case/eighth allocation case/twelfth allocation case may correspond to cases, wherein resource allocation is not possible.

Interleaving is performed on the 56-tone tone design resource unit based on the conventional 52-size interleaver, and 4 tones may be allocated as the pilot tone. The 56-tone tone design resource unit may be usefully used in a 5 MHz bandwidth.

According to the exemplary embodiment of the present invention, the location of the 4-tone additional tone unit may change (or vary).

According to another exemplary embodiment of the present invention, with the change (or variation) in the location of the 4-tone additional tone unit, resource allocation that is based on a left guard tone, [26, 26, 26, 4, 26, 26, 26, 4, 26, 26, 26], and a right guard tone may be performed. In this case, the 56-tone tone design resource unit may be allocated to the locations of the resource allocation units in parentheses (or brackets), such as [26, (26, 26, 4), 26, 26, 26, 4, 26, 26, 26] and [26, 26, (26, 4, 26), 26, 26, 4, 26, 26, 26], [26, 26, 26, 4, 26, 26, (26, 4, 26), 26, 26] and [26, 26, 26, 4, 26, 26, (4, 26, 26), 26], and the 4-tone additional tone unit.

According to yet another exemplary embodiment of the present invention, with the change (or variation) in the location of the 4-tone additional tone unit, resource allocation that is based on a left guard tone, [26, 26, 26, 26, 4, 26, 4, 26, 26, 26, 26], and a right guard tone may be performed. In this case, the 56-tone tone design resource unit may be allocated to the locations of the resource allocation units in parentheses (or brackets), such as [26, 26, (26, 26, 4), 26, 4, 26, 26, 26, 26] and [26, 26, 26, 26, 4, 26, (4, 26, 26), 26, 26], and the 4-tone additional tone unit.

Figure 9:
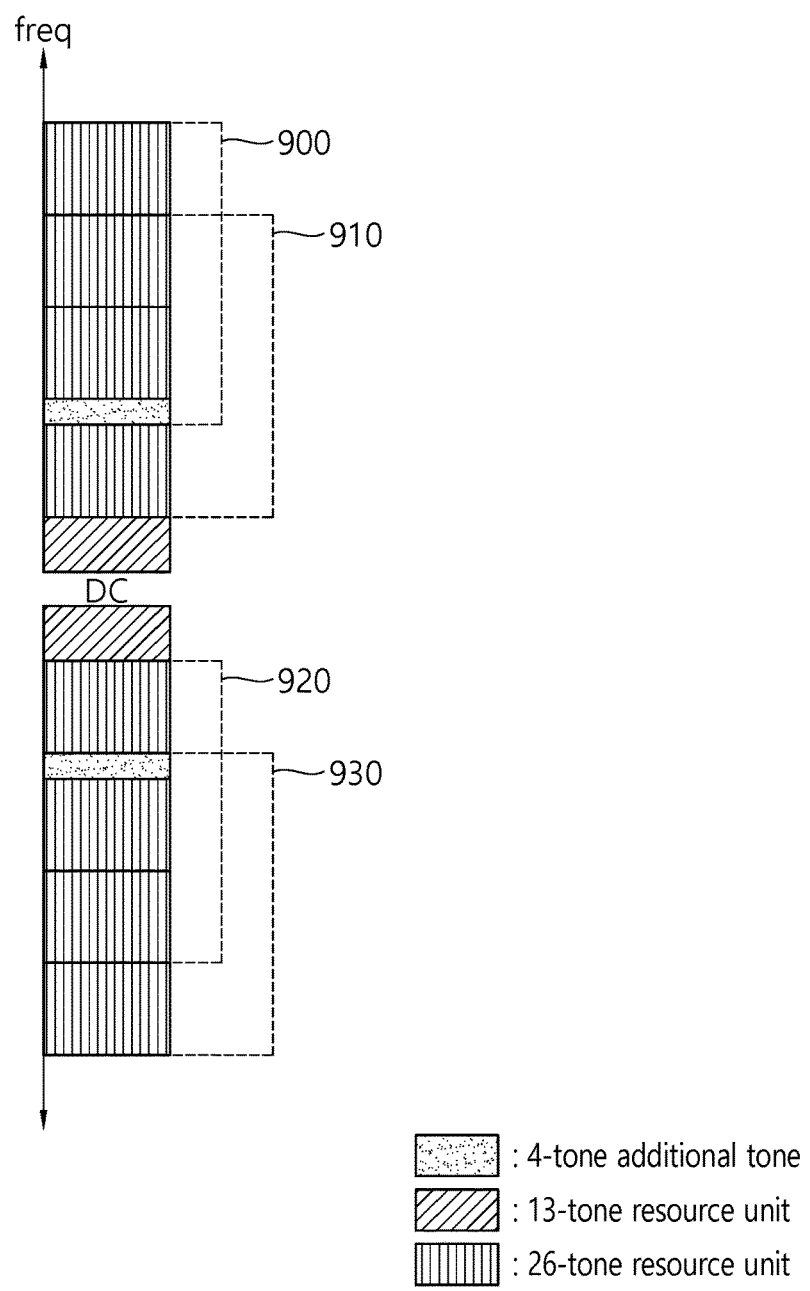
FIG. 9 is a conceptual view illustrating a resource allocation method according to an exemplary embodiment of the present invention.

FIG. 9 is a conceptual view illustrating a resource allocation method according to an exemplary embodiment of the present invention.

FIG. 9 discloses a resource allocation method that is based on an 82-tone tone design resource unit, which is configured of 3 26-tone resource units and 1 4-tone additional tone unit (4 leftover tones).

Referring to FIG. 9, a left guard tone, 3 26-tone resource units, a 4-tone first additional tone unit, 1 26-tone resource unit, a 13-tone divided resource unit, a DC tone, a 13-tone divided resource unit, 1 26-tone resource unit, a 4-tone second additional tone unit, 3 26-tone resource units, and a right guard tone may be allocated within the 20 MHz bandwidth.

According to the exemplary embodiment of the present invention, an 82-tone tone design resource unit, which is configured of 3 26-tone resource unit and 1 4-tone additional tone unit, may be defined.

The 82-tone tone design resource unit may be allocated to one allocatable location available for allocating the tone design resource unit among a plurality of allocatable locations available for allocating the tone design resource unit, which are defined based on the 4-tone first additional tone unit or the 4-tone second additional tone unit.

For example, a first allocatable location 900 available for allocating the tone design resource unit may correspond to the allocation locations of 3 26-tone resource units and the 4-tone first additional tone unit, which are sequentially allocated based on the left guard tone.

A second allocatable location 910 available for allocating the tone design resource unit may correspond to the allocation locations of 2 26-tone resource units, the 4-tone first additional tone unit, and 1 26-tone resource unit, which are sequentially allocated based on the left guard tone.

A third allocatable location 920 available for allocating the tone design resource unit may correspond to the allocation locations of 1 26-tone resource unit, the 4-tone second additional tone unit, and 2 26-tone resource units, which are sequentially allocated based on the left guard tone.

A fourth allocatable location 930 available for allocating the tone design resource unit may correspond to the allocation locations of the 4-tone second additional tone unit, and 3 26-tone resource units, which are sequentially allocated based on the left guard tone.

Similarly, in case the 82-tone tone design resource unit corresponds to one allocatable location available for the resource allocation of the tone design resource unit, among the plurality of allocatable locations available for the resource allocation of the tone design resource unit, a subband selective transmission may be performed. More specifically, the tone design resource unit may be allocated to one allocatable location available for the resource allocation of the tone design resource unit, among the plurality of allocatable locations available for the resource allocation of the tone design resource unit, in accordance with the channel status.

Table 3 shown below discloses the allocation of resource units in accordance with the number of STAs that are allocated with resource units within the frequency axis.

TABLE 3

| Allocation case | K (17 set) | 1x26 | 2x26 | 3x26 + 4 ~~3x26~~ | 4x26 |
|---|---|---|---|---|---|
| ~~1~~ | ~~3~~ | ~~0~~ | ~~0~~ | ~~3~~ | ~~0~~ |
| 2 | 3 | 0 | 1 | 1 | 1 |

TABLE 3-continued

| Allocation case | K (17 set) | 1x26 | 2x26 | 3x26 + 4 ~~3x26~~ | 4x26 |
|---|---|---|---|---|---|
| 3 | 3 | 1 | 0 | 0 | 2 |
| 4 | 4 | 0 | 3 | 1 | 0 |
| 5 | 4 | 1 | 1 | 2 | 0 |
| 6 | 4 | 1 | 2 | 0 | 1 |
| 7 | 4 | 2 | 0 | 1 | 1 |
| 8 | 5 | 1 | 4 | 0 | 0 |
| 9 | 5 | 2 | 2 | 1 | 0 |
| 10 | 5 | 3 | 0 | 2 | 0 |
| 11 | 5 | 3 | 1 | 0 | 1 |
| 12 | 6 | 3 | 3 | 0 | 0 |
| 13 | 6 | 4 | 1 | 1 | 0 |
| 14 | 6 | 5 | 0 | 0 | 1 |
| 15 | 7 | 5 | 2 | 0 | 0 |
| 16 | 7 | 6 | 0 | 1 | 0 |
| 17 | 8 | 7 | 1 | 0 | 0 |
| 18 | 9 | 9 | 0 | 0 | 0 |

In Table 3, a case when 9 26-tone resource units are allocated within the 20 MHz bandwidth will be assumed.

Referring to Table 3, one STA may be allocated with a first resource unit group including 1 26-tone resource unit, a second resource unit group including 2 26-tone resource units, a third resource unit group including 3 26-tone resource units and 1 4-tone additional tone unit, and a fourth resource unit group including 4 26-tone resource units.

For example, a fourth allocation case corresponds to a case when each of 4 STAs is respectively allocated with 3 second resource unit groups, and the third resource unit group. More specifically, STA1 may be allocated with the second resource unit group, STA2 may be allocated with the second resource unit group, STA3 may be allocated with the third resource unit group, and STA4 may be allocated with the third resource unit group.

A first allocation case shows an exemplary case when resource allocation is not possible. Since the total number of leftover tones within the 20 MHz bandwidth is equal to 8 tones, and since up to 2 second resource unit groups can be allocated, the first allocation case may correspond to a case, wherein resource allocation is not possible.

The definition of the allocation of a new interleaver/new pilot for the 82-tone tone design resource unit may be required.

According to the exemplary embodiment of the present invention, the location of the 4-tone additional tone unit may change (or vary).

For example, according to another exemplary embodiment of the present invention, with the change (or variation) in the location of the 4-tone additional tone unit, resource allocation that is based on a left guard tone, [26, 26, 26, 26, 4, 26, 4, 26, 26, 26, 26], and a right guard tone may be performed. In this case, the 82-tone tone design resource unit may be allocated to the locations of the resource allocation units in parentheses (or brackets), such as [26, (26, 26, 26, 4), 26, 4, 26, 26, 26, 26] and [26, 26, 26, 26, 4, 26, (4, 26, 26, 26), 26], and the 4-tone additional tone unit.

According to yet another exemplary embodiment of the present invention, with the change (or variation) in the location of the 4-tone additional tone unit, resource allocation that is based on a left guard tone, [26, 26, 4, 26, 26, 26, 26, 26, 4, 26, 26], and a right guard tone may be performed. In this case, the 82-tone tone design resource unit may be allocated to the locations of the resource allocation units in parentheses (or brackets), such as [26, (26, 4, 26, 26), 26, 26, 26, 4, 26, 26] and [26, 26, 4, 26, 26, 26, (26, 26, 4, 26), 26], and so on, and the 4-tone additional tone unit.

According to yet another exemplary embodiment of the present invention, with the change (or variation) in the location of the 4-tone additional tone unit, resource allocation that is based on a left guard tone, [26, 4, 26, 26, 26, 26, 26, 26, 26, 4, 26], and a right guard tone may be performed. In this case, the 82-tone tone design resource unit may be allocated to the locations of the resource allocation units in parentheses (or brackets), such as [26, (4, 26, 26, 26), 26, 26, 26, 26, 4, 26] and [26, 4, 26, 26, 26, 26, (26, 26, 26, 4), 26], and so on, and the 4-tone additional tone unit.

Figure 10:
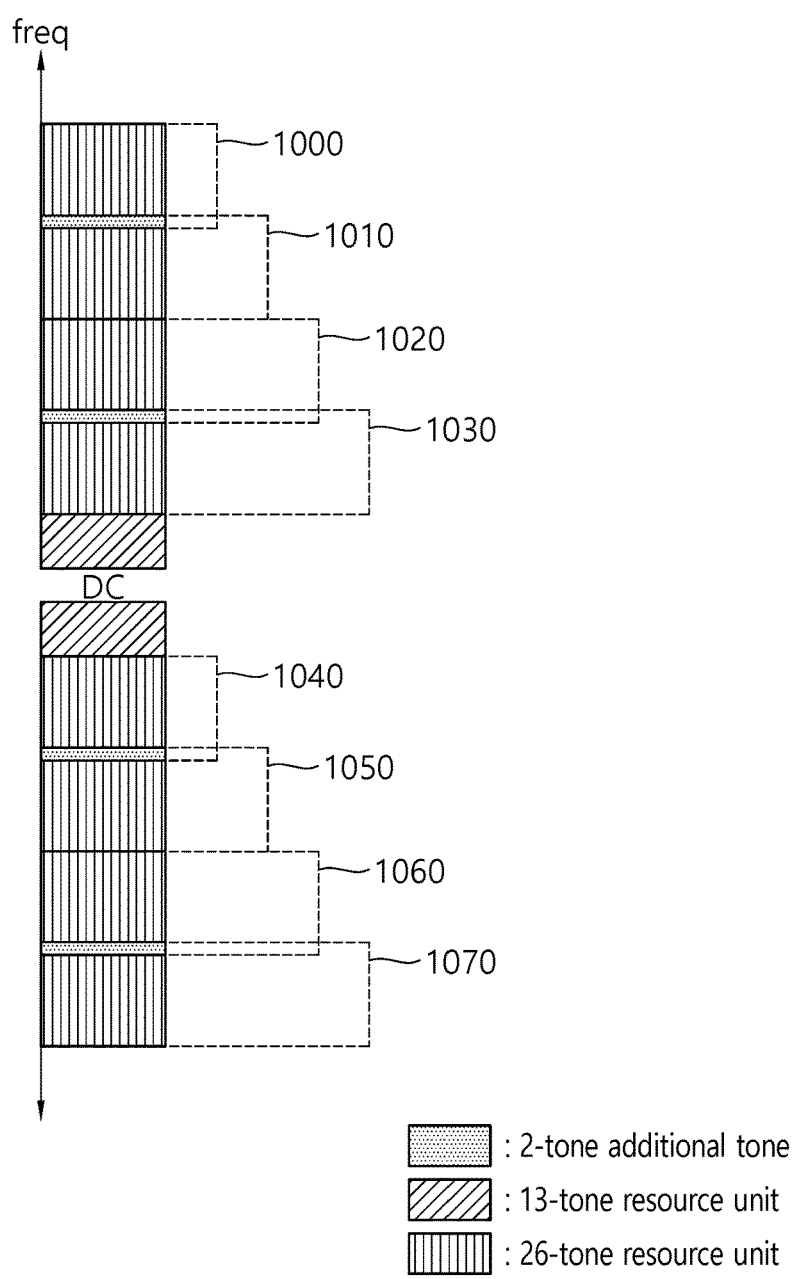
FIG. 10 is a conceptual view illustrating a resource allocation method according to an exemplary embodiment of the present invention.

FIG. 10 is a conceptual view illustrating a resource allocation method according to an exemplary embodiment of the present invention.

FIG. 10 discloses a resource allocation method that is based on a 28-tone tone design resource unit, which is configured of 1 26-tone resource unit and 1 2-tone additional tone unit (2 leftover tones).

Referring to FIG. 10, a left guard tone, 1 26-tone resource unit, a 2-tone first additional tone unit, 2 26-tone resource units, a 2-tone second additional tone unit, 1 26-tone resource unit, a 13-tone divided resource unit, a DC tone, a 13-tone divided resource unit, 1 26-tone resource unit, a 2-tone third additional tone unit, 2 26-tone resource units, a 2-tone fourth additional tone unit, 1 26-tone resource unit, and a right guard tone may be allocated within the 20 MHz bandwidth.

According to the exemplary embodiment of the present invention, a 28-tone tone design resource unit, which is configured of 1 26-tone resource unit and 1 2-tone additional tone unit, may be defined.

The 28-tone tone design resource unit may be allocated to one allocatable location available for allocating the tone design resource unit among a plurality of allocatable locations available for allocating the tone design resource unit, which are defined based on the 2-tone first additional tone unit to the 2-tone fourth additional tone unit.

For example, a first allocatable location 1000 available for allocating the tone design resource unit may correspond to the allocation locations of 1 26-tone resource unit and the 2-tone first additional tone unit, which are sequentially allocated based on the left guard tone.

A second allocatable location 1010 available for allocating the tone design resource unit may correspond to the allocation locations of the 2-tone first additional tone unit and 1 26-tone resource unit, which are sequentially allocated based on the left guard tone.

A third allocatable location 1020 available for allocating the tone design resource unit may correspond to the allocation locations of 1 26-tone resource unit and the 2-tone second additional tone unit, which are sequentially allocated based on the left guard tone.

A fourth allocatable location 1030 available for allocating the tone design resource unit may correspond to the allocation locations of the 2-tone second additional tone unit and 1 26-tone resource unit, which are sequentially allocated based on the left guard tone.

A fifth allocatable location 1040 available for allocating the tone design resource unit may correspond to the allocation locations of 1 26-tone resource unit and the 2-tone third additional tone unit, which are sequentially allocated based on the left guard tone.

A sixth allocatable location 1050 available for allocating the tone design resource unit may correspond to the allocation locations of the 2-tone third additional tone unit and 1 26-tone resource unit, which are sequentially allocated based on the left guard tone.

A seventh allocatable location 1060 available for allocating the tone design resource unit may correspond to the allocation locations of 1 26-tone resource unit and the 2-tone fourth additional tone unit, which are sequentially allocated based on the left guard tone.

An eighth allocatable location 1070 available for allocating the tone design resource unit may correspond to the allocation locations of the 2-tone fourth additional tone unit and 1 26-tone resource unit, which are sequentially allocated based on the left guard tone.

Similarly, in case the 28-tone tone design resource unit corresponds to one allocatable location available for the resource allocation of the tone design resource unit, among the plurality of allocatable locations available for the resource allocation of the tone design resource unit, a subband selective transmission may be performed. More specifically, the tone design resource unit may be allocated to one allocatable location available for the resource allocation of the tone design resource unit, among the plurality of allocatable locations available for the resource allocation of the tone design resource unit, in accordance with the channel status.

Table 4 shown below discloses the allocation of resource units in accordance with the number of STAs that are allocated with resource units within the frequency axis.

TABLE 4

| Allocation case | K (13 set) | 1x26 + 2 ~~4x26~~ | 2x26 | 3x26 | 4x26 |
|---|---|---|---|---|---|
| 1 | 3 | 0 | 0 | 3 | 0 |
| 2 | 3 | 0 | 1 | 1 | 1 |
| 3 | 3 | 1 | 0 | 0 | 2 |
| 4 | 4 | 0 | 3 | 1 | 0 |
| 5 | 4 | 1 | 1 | 2 | 0 |
| 6 | 4 | 1 | 2 | 0 | 1 |
| 7 | 4 | 2 | 0 | 1 | 1 |
| 8 | 5 | 1 | 4 | 0 | 0 |
| 9 | 5 | 2 | 2 | 1 | 0 |
| 10 | 5 | 3 | 0 | 2 | 0 |
| 11 | 5 | 3 | 1 | 0 | 1 |
| 12 | 6 | 3 | 3 | 0 | 0 |
| 13 | 6 | 4 | 1 | 1 | 0 |
| ~~14~~ | ~~6~~ | ~~5~~ | ~~0~~ | ~~0~~ | ~~1~~ |
| ~~15~~ | ~~7~~ | ~~5~~ | ~~2~~ | ~~0~~ | ~~0~~ |
| ~~16~~ | ~~7~~ | ~~6~~ | ~~0~~ | ~~1~~ | ~~0~~ |
| ~~17~~ | ~~8~~ | ~~7~~ | ~~1~~ | ~~0~~ | ~~0~~ |
| ~~18~~ | ~~9~~ | ~~9~~ | ~~0~~ | ~~0~~ | ~~0~~ |

In Table 4, a case when 9 26-tone resource units are allocated within the 20 MHz bandwidth will be assumed.

Referring to Table 4, one STA may be allocated with a first resource unit group including a tone design resource unit, which is configured of 1 26-tone resource unit and 1 2-tone additional tone unit, a second resource unit group including 2 26-tone resource units, a third resource unit group including 3 26-tone resource units, and a fourth resource unit group including 4 26-tone resource units.

For example, a fifth allocation case corresponds to a case when each of 4 STAs is respectively allocated with one first resource unit group, one second resource unit group, and 2 third resource unit groups. More specifically, STA1 may be allocated with the first resource unit group, STA2 may be allocated with the second resource unit group, STA3 may be allocated with the third resource unit group, and STA4 may be allocated with the third resource unit group.

A fourteenth allocation case shows an exemplary case when resource allocation is not possible. Since the total number of leftover tones within the 20 MHz bandwidth is equal to 8 tones, and since up to 4 first resource unit groups can be allocated, the fourteenth allocation case may correspond to a case, wherein resource allocation is not possible.

Figure 11:
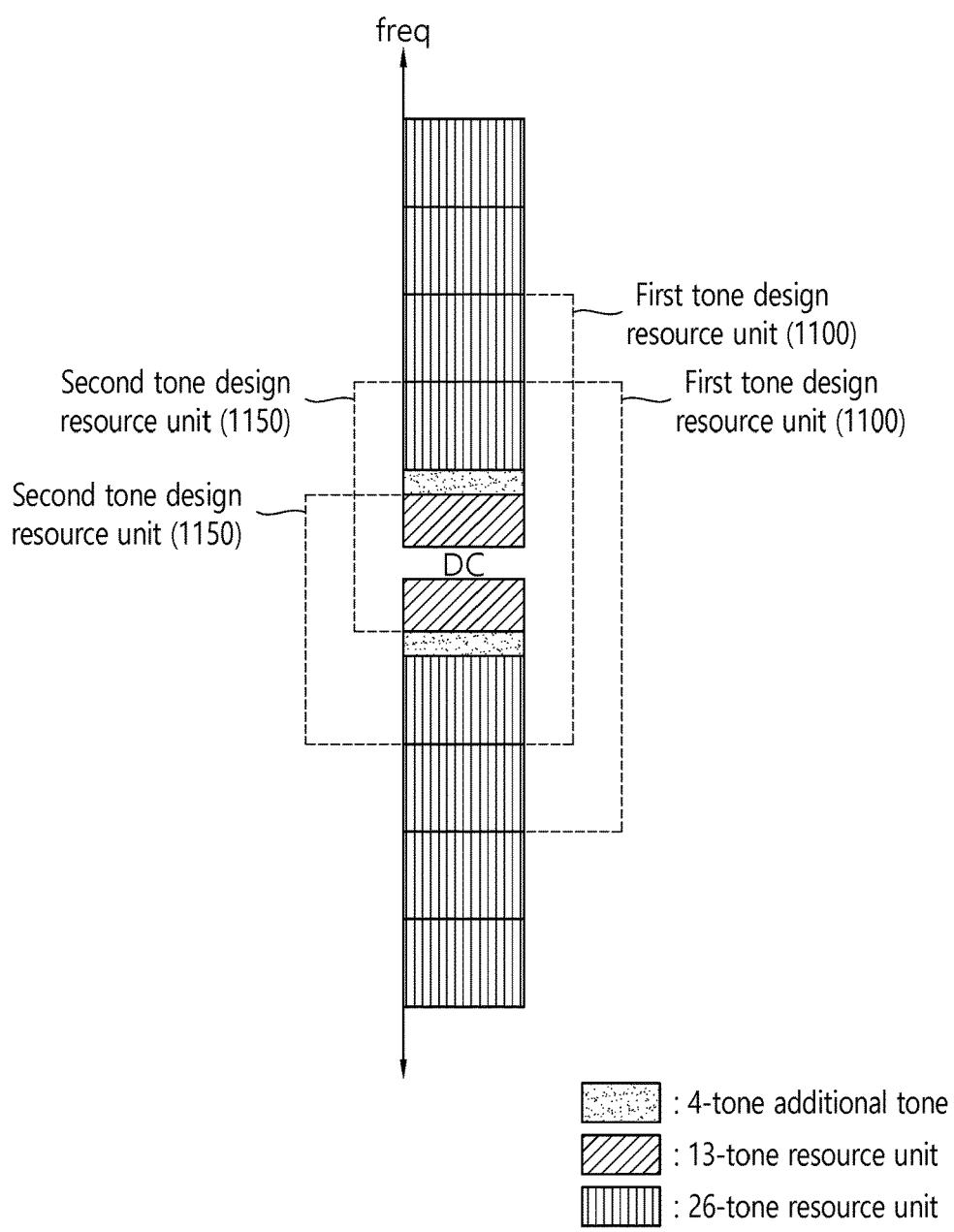
FIG. 11 is a conceptual view illustrating a resource allocation method according to an exemplary embodiment of the present invention.

FIG. 11 is a conceptual view illustrating a resource allocation method according to an exemplary embodiment of the present invention.

FIG. 11 discloses a resource allocation method that is based on a 112-tone first tone design resource unit, which is configured of 4 26-tone resource unit and 2 4-tone additional tone units (8 leftover tones), and a 56-tone second tone design resource unit, which is configured of 2 26-tone resource units and 1 4-tone additional tone unit (4 leftover tones).

Referring to FIG. 11, a left guard tone, 4 26-tone resource units, a 4-tone first additional tone unit, a 13-tone divided resource unit, a DC tone, a 13-tone divided resource unit, a 4-tone second additional tone unit, 4 26-tone resource units, and a right guard tone may be allocated within the 20 MHz bandwidth.

According to the exemplary embodiment of the present invention, a 112-tone first tone design resource unit 1100, which is configured of 4 26-tone resource units and 2 4-tone additional tone units, and a 56-tone second tone design resource unit 1150, which is configured of 2 26-tone resource units and 1 4-tone additional tone unit, may be defined.

Just as described above, a plurality of allocatable locations available for the resource allocation of each of the first tone design resource unit 1100 and the second tone design resource unit 1150 may be configured, and each of the first tone design resource unit 1100 and the second tone design resource unit 1150 may be respectively allocated to one allocatable location available for the resource allocation of the tone design resource unit among a plurality of allocatable locations available for the resource allocation of the tone design resource unit.

Table 5 shown below discloses the allocation of resource units in accordance with the number of STAs that are allocated with resource units within the frequency axis.

TABLE 5

| Allocation case | K (11 set) | 1×26 | 2×26 + 4 ~~2×26~~ | 3×26 | 4×26 + 8 ~~4×26~~ |
|---|---|---|---|---|---|
| 1 | 3 | 0 | 0 | 3 | 0 |
| ~~2~~ | ~~3~~ | ~~0~~ | ~~1~~ | ~~1~~ | ~~1~~ |
| 3 | 3 | 1 | 0 | 0 | 2 |
| 4 | 4 | 0 | 3 | 1 | 0 |
| 5 | 4 | 1 | 1 | 2 | 0 |
| 6 | 4 | 1 | 2 | 0 | 1 |
| 7 | 4 | 2 | 0 | 1 | 1 |
| ~~8~~ | ~~5~~ | ~~1~~ | ~~4~~ | ~~0~~ | ~~0~~ |
| 9 | 5 | 2 | 2 | 1 | 0 |
| 10 | 5 | 3 | 0 | 2 | 0 |
| ~~11~~ | ~~5~~ | ~~3~~ | ~~1~~ | ~~0~~ | ~~1~~ |
| ~~12~~ | ~~6~~ | ~~3~~ | ~~3~~ | ~~0~~ | ~~0~~ |
| 13 | 6 | 4 | 1 | 1 | 0 |
| 14 | 6 | 5 | 0 | 0 | 1 |
| 15 | 7 | 5 | 2 | 0 | 0 |
| 16 | 7 | 6 | 0 | 1 | 0 |
| 17 | 8 | 7 | 1 | 0 | 0 |
| 18 | 9 | 9 | 0 | 0 | 0 |

In Table 5, a case when 9 26-tone resource units are allocated within the 20 MHz bandwidth will be assumed.

Referring to Table 5, one STA may be allocated with a first resource unit group including 1 26-tone resource unit, a second resource unit group including a first tone design resource unit 1100, which is configured of 2 26-tone resource units and 1 4-tone additional tone unit, a third resource unit group including 3 26-tone resource units, and a fourth resource unit group including a second tone design resource unit 1150, which is configured of 4 26-tone resource units and 2 4-tone additional tone units.

In case the first tone design resource unit 1100 and the second tone design resource unit 1150 are being supported, 11 different types of allocation cases may be supported for the 20 MHz bandwidth.

Figure 12:
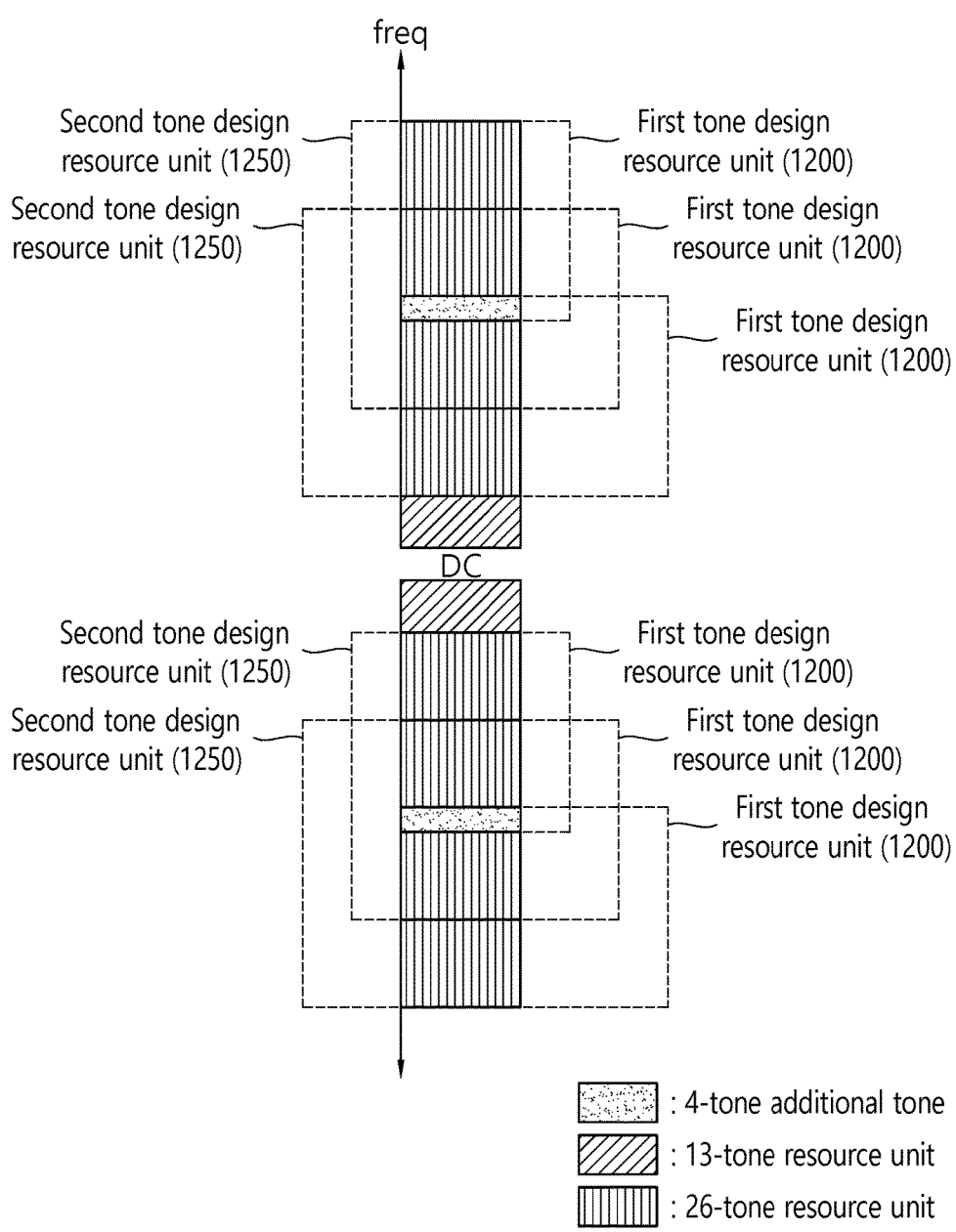
FIG. 12 is a conceptual view illustrating a resource allocation method according to an exemplary embodiment of the present invention.

FIG. 12 is a conceptual view illustrating a resource allocation method according to an exemplary embodiment of the present invention.

FIG. 12 discloses a resource allocation method that is based on a 56-tone first tone design resource unit, which is configured of 2 26-tone resource units and 1 4-tone additional tone unit (4 leftover tones), and an 82-tone second tone design resource unit, which is configured of 3 26-tone resource units and 1 4-tone additional tone unit (4 leftover tones).

Referring to FIG. 12, a left guard tone, 2 26-tone resource units, a 4-tone first additional tone unit, 2 26-tone resource units, a 13-tone divided resource unit, a DC tone, a 13-tone divided resource unit, 2 26-tone resource units, a 4-tone second additional tone unit, 2 26-tone resource units, and a right guard tone may be allocated within the 20 MHz bandwidth.

According to the exemplary embodiment of the present invention, a 56-tone first tone design resource unit 1200, which is configured of 2 26-tone resource units and 1 4-tone additional tone unit, and an 82-tone second tone design resource unit 1250, which is configured of 3 26-tone resource units and 1 4-tone additional tone unit, may be defined.

Just as described above, a plurality of allocatable locations available for the resource allocation of each of the first tone design resource unit 1200 and the second tone design resource unit 1250 may be configured, and each of the first tone design resource unit 1200 and the second tone design resource unit 1250 may be respectively allocated to one allocatable location available for the resource allocation of the tone design resource unit among a plurality of allocatable locations available for the resource allocation of the tone design resource unit.

Table 6 shown below discloses the allocation of resource units in accordance with the number of STAs that are allocated with resource units within the frequency axis.

TABLE 6

| Allocation case | K (12 set) | 1×26 | 2×26 + 4 2×26 | 3×26 + 4 ~~3×26~~ | 4×26 |
|---|---|---|---|---|---|
| ~~1~~ | ~~3~~ | ~~0~~ | ~~0~~ | ~~3~~ | ~~0~~ |
| 2 | 3 | 0 | 1 | 1 | 1 |
| 3 | 3 | 1 | 0 | 0 | 2 |
| 4 | 4 | 0 | 3 | 1 | 0 |
| ~~5~~ | ~~4~~ | ~~1~~ | ~~1~~ | ~~2~~ | ~~0~~ |
| 6 | 4 | 1 | 2 | 0 | 1 |
| 7 | 4 | 2 | 0 | 1 | 1 |
| ~~8~~ | ~~5~~ | ~~1~~ | ~~4~~ | ~~0~~ | ~~0~~ |
| ~~9~~ | ~~5~~ | ~~2~~ | ~~2~~ | ~~1~~ | ~~0~~ |
| 10 | 5 | 3 | 0 | 2 | 0 |
| 11 | 5 | 3 | 1 | 0 | 1 |
| ~~12~~ | ~~6~~ | ~~3~~ | ~~3~~ | ~~0~~ | ~~0~~ |
| 13 | 6 | 4 | 1 | 1 | 0 |
| 14 | 6 | 5 | 0 | 0 | 1 |
| 15 | 7 | 5 | 2 | 0 | 0 |
| 16 | 7 | 6 | 0 | 1 | 0 |
| 17 | 8 | 7 | 1 | 0 | 0 |
| 18 | 9 | 9 | 0 | 0 | 0 |

In Table 6, a case when 9 26-tone resource units are allocated within the 20 MHz bandwidth will be assumed.

Referring to Table 6, one STA may be allocated with a first resource unit group including 1 26-tone resource unit, a second resource unit group including a first tone design resource unit 1200, which is configured of 2 26-tone resource units and 1 4-tone additional tone unit, a third resource unit group including a second tone design resource unit 1250, which is configured of 3 26-tone resource units and 1 4-tone additional tone unit, and a fourth resource unit group including 4 26-tone resource units.

In case the first tone design resource unit 1200 and the second tone design resource unit 1250 are being supported, 12 different types of allocation cases may be supported for the 20 MHz bandwidth.

Although gain of the subband selective transmission of the second tone design resource unit 1250 may be deduced due to the allocation of the first tone design resource unit 1200, the allocation of the first tone design resource unit 1200 and the second tone design resource unit 1250 may be determined through the scheduling of the AP.

Figure 13:
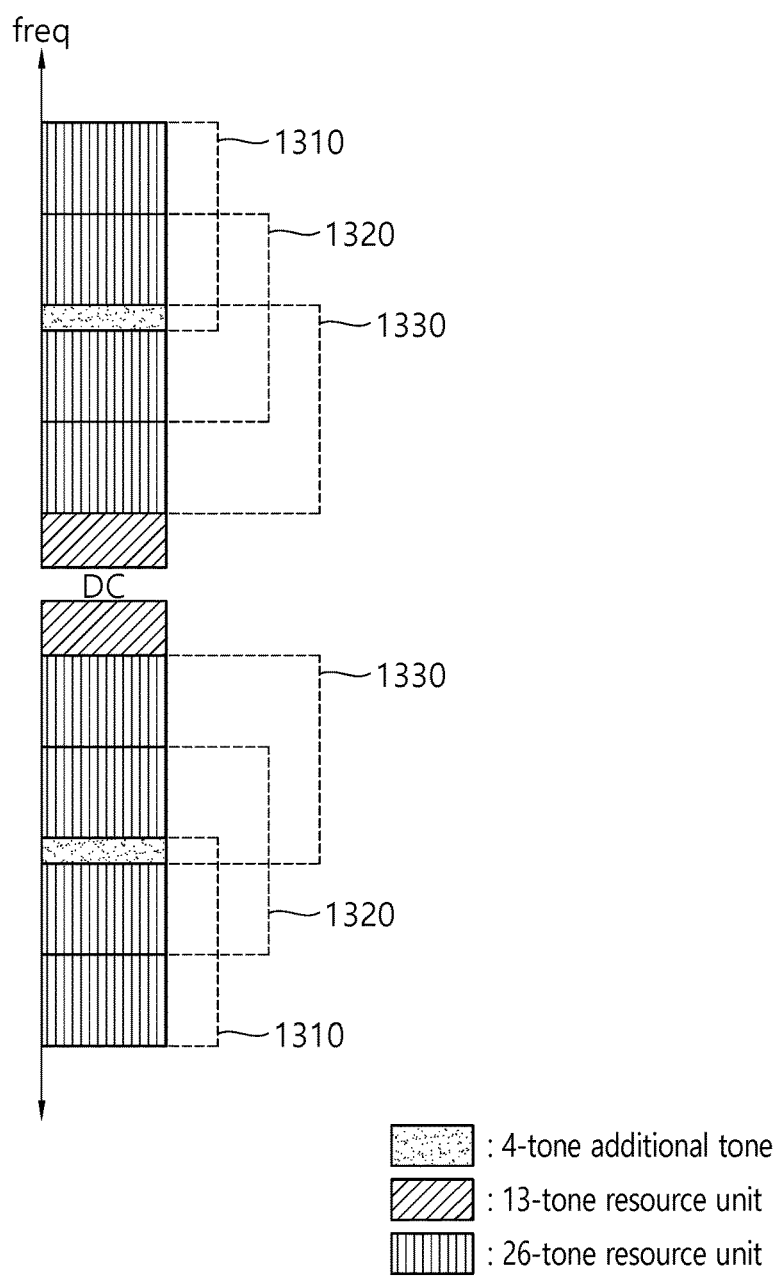
FIG. 13 is a conceptual view illustrating a resource allocation method according to an exemplary embodiment of the present invention.

FIG. 13 is a conceptual view illustrating a resource allocation method according to an exemplary embodiment of the present invention.

FIG. 13 discloses a resource allocation method that is based on a 112-tone first tone design resource unit, which is configured of 4 26-tone resource unit and 2 4-tone additional tone units (8 leftover tones), and a 56-tone second tone design resource unit, which is configured of 2 26-tone resource units and 1 4-tone additional tone unit (4 leftover tones).

Referring to FIG. 13, a left guard tone, 2 26-tone resource units, a 4-tone first additional tone unit, 2 26-tone resource units, a 13-tone divided resource unit, a DC tone, a 13-tone divided resource unit, 2 26-tone resource units, a 4-tone second additional tone unit, 2 26-tone resource units, and a right guard tone may be allocated within the 20 MHz bandwidth.

According to the exemplary embodiment of the present invention, a 112-tone first tone design resource unit, which is configured of 4 26-tone resource units and 2 4-tone additional tone units, and a 56-tone second tone design resource unit, which is configured of 2 26-tone resource units and 1 4-tone additional tone unit, may be defined.

Just as described above, a plurality of allocatable locations available for the resource allocation of each of the first tone design resource unit and the second tone design resource unit may be configured, and each of the first tone design resource unit and the second tone design resource unit may be respectively allocated to one allocatable location available for the resource allocation of the tone design resource unit among a plurality of allocatable locations available for the resource allocation of the tone design resource unit. In case of the first tone design resource unit, the first tone design resource unit may be allocated not only to contiguous frequency resources but also to non-contiguous frequency resources.

For example, in case the resource allocation structure for the 20 MHz bandwidth corresponds to [26, 26, 4, 26, 26, 26, 26, 26, 4, 26, 26], the first allocatable location 1310 of the first tone design resource unit may correspond to the allocation locations of the resource units in parentheses (or brackets), such as [(26, 26, 4), 26, 26, 26, 26, 26, (4, 26, 26)]. The second allocatable location 1320 of the first tone design resource unit may correspond to the allocation locations of the resource units in parentheses (or brackets), such as [26, (26, 4, 26), 26, 26, 26, (26, 4, 26), 26]. The third allocatable location 1330 of the first tone design resource unit may correspond to the allocation locations of the resource units in parentheses (or brackets), such as [26, 26, (4, 26, 26), 26, (26, 26, 4), 26, 26].

Table 7 shown below discloses the allocation of resource units in accordance with the number of STAs that are allocated with resource units within the frequency axis.

TABLE 7

| Allocation case | K (11 set) | 1×26 | 2×26 + 4 ~~2×26~~ | 3×26 | 4×26 + 8 ~~4×26~~ |
|---|---|---|---|---|---|
| 1 | 3 | 0 | 0 | 3 | 0 |
| 2 | 3 | 0 | 1 | 1 | 1 |
| 3 | 3 | 1 | 0 | 0 | 2 |
| 4 | 4 | 0 | 3 | 1 | 0 |
| 5 | 4 | 1 | 1 | 2 | 0 |
| 6 | 4 | 1 | 2 | 0 | 1 |
| 7 | 4 | 2 | 0 | 1 | 1 |
| 8 | 5 | 1 | 4 | 0 | 0 |
| 9 | 5 | 2 | 2 | 1 | 0 |
| 10 | 5 | 3 | 0 | 2 | 0 |
| 11 | 5 | 3 | 1 | 0 | 1 |
| 12 | 6 | 3 | 3 | 0 | 0 |
| 13 | 6 | 4 | 1 | 1 | 0 |
| 14 | 6 | 5 | 0 | 0 | 1 |
| 15 | 7 | 5 | 2 | 0 | 0 |
| 16 | 7 | 6 | 0 | 1 | 0 |
| 17 | 8 | 7 | 1 | 0 | 0 |
| 18 | 9 | 9 | 0 | 0 | 0 |

In Table 7, a case when 9 26-tone resource units are allocated within the 20 MHz bandwidth will be assumed.

Referring to Table 7, one STA may be allocated with a first resource unit group including 1 26-tone resource unit, a second resource unit group including a first tone design resource unit, which is configured of 2 26-tone resource units and 1 4-tone additional tone unit, a third resource unit group including 3 26-tone resource units, and a fourth resource unit group including a second tone design resource unit, which is configured of 4 26-tone resource units and 2 4-tone additional tone units.

In case the first tone design resource unit and the second tone design resource unit are being supported, 11 different types of allocation cases may be supported for the 20 MHz bandwidth.

Figure 14:
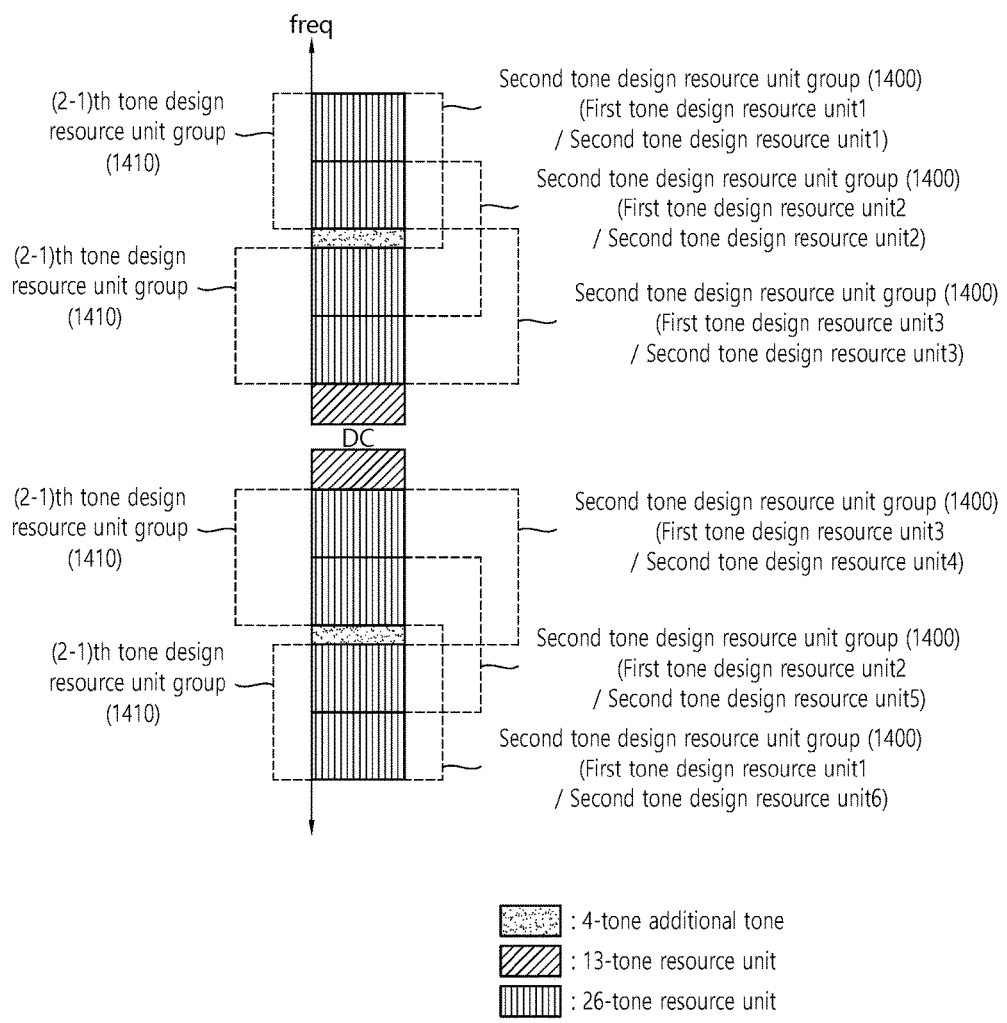
FIG. 14 is a conceptual view illustrating a resource allocation method according to an exemplary embodiment of the present invention.

FIG. 14 is a conceptual view illustrating a resource allocation method according to an exemplary embodiment of the present invention.

FIG. 14 discloses a resource allocation method that is based on a 112-tone first tone design resource unit, which is configured of 4 26-tone resource unit and 2 4-tone additional tone units (8 leftover tones), and a 56-tone second tone design resource unit, which is configured of 2 26-tone resource units and 1 4-tone additional tone unit (4 leftover tones). Most particularly, FIG. 14 discloses a method for performing scheduling of resource units by additionally using a resource unit group including 2 26-tone resource units.

Referring to FIG. 14, a left guard tone, 2 26-tone resource units, a 4-tone first additional tone unit, 2 26-tone resource units, a 13-tone divided resource unit, a DC tone, a 13-tone divided resource unit, 2 26-tone resource units, a 4-tone second additional tone unit, 2 26-tone resource units, and a right guard tone may be allocated within the 20 MHz bandwidth.

According to the exemplary embodiment of the present invention, a 112-tone first tone design resource unit, which is configured of 4 26-tone resource units and 2 4-tone additional tone units, and a 56-tone second tone design resource unit, which is configured of 2 26-tone resource units and 1 4-tone additional tone unit, may be defined.

As described above in FIG. 13, a plurality of allocatable locations available for the resource allocation of each of the first tone design resource unit and the second tone design resource unit may be configured, and each of the first tone design resource unit and the second tone design resource unit may be respectively allocated to one allocatable location available for the resource allocation of the tone design resource unit among a plurality of allocatable locations available for the resource allocation of the tone design resource unit. In case of the first tone design resource unit, the first tone design resource unit may be allocated not only to contiguous frequency resources but also to non-contiguous frequency resources.

According to the exemplary embodiment of the present invention, allocation of resource units may be scheduled by additionally defining a separate resource unit group including 2 26-tone resource units instead of the first tone design resource unit.

Table 8 shown below discloses the allocation of resource units in accordance with the number of STAs that are allocated with resource units within the frequency axis.

TABLE 8

| Allocation case | K (17 set) | 1x26 | 2x26 + 4 w 2x26 | 3x26 | 4x26 + 8 4x26 |
|---|---|---|---|---|---|
| 1  | 3 | 0 | 0     | 3 | 0 |
| 2  | 3 | 0 | 1[1)] | 1 | 1 |
| 3  | 3 | 1 | 0     | 0 | 2 |
| 4  | 4 | 0 | 3[1)] | 1 | 0 |
| 5  | 4 | 1 | 1[2)] | 2 | 0 |
| 6  | 4 | 1 | 2[1)] | 0 | 1 |
| 7  | 4 | 2 | 0     | 1 | 1 |
| 8  | 5 | 1 | 4[1)] | 0 | 0 |
| 9  | 5 | 2 | 2[2)] | 1 | 0 |
| 10 | 5 | 3 | 0     | 2 | 0 |
| 11 | 5 | 3 | 1[1)] | 0 | 1 |
| 12 | 6 | 3 | 3[1)] | 0 | 0 |
| 13 | 6 | 4 | 1[2)] | 1 | 0 |
| 14 | 6 | 5 | 0     | 0 | 1 |
| 15 | 7 | 5 | 2[2)] | 0 | 0 |
| 16 | 7 | 6 | 0     | 1 | 0 |
| 17 | 8 | 7 | 1[2)] | 0 | 0 |
| 18 | 9 | 9 | 0     | 0 | 0 |

The second resource unit group 1400 and the (2-1)[th] resource unit group 1410 may be used to replace one another.
[1)] may indicate the usage of the (2-1)[th] resource unit group 1410, and
[2)] may indicate the usage of the second resource unit group 1400.

In Table 8, a case when 9 26-tone resource units are allocated within the 20 MHz bandwidth will be assumed.

Referring to Table 8, one STA may be allocated with a first resource unit group including 1 26-tone resource unit, a second resource unit group 1400 including a first tone design resource unit, which is configured of 2 26-tone resource units and 1 4-tone additional tone unit, a (2-1)[th] resource unit group 1410 including 2 26-tone resource units, a third resource unit group including 3 26-tone resource units, and a fourth resource unit group including a second tone design resource unit, which is configured of 4 26-tone resource units and 2 4-tone additional tone units.

In this case, in case the first tone design resource unit and the second tone design resource unit are being supported, 17 different types of allocation cases may be supported for the 20 MHz bandwidth.

Figure 15:
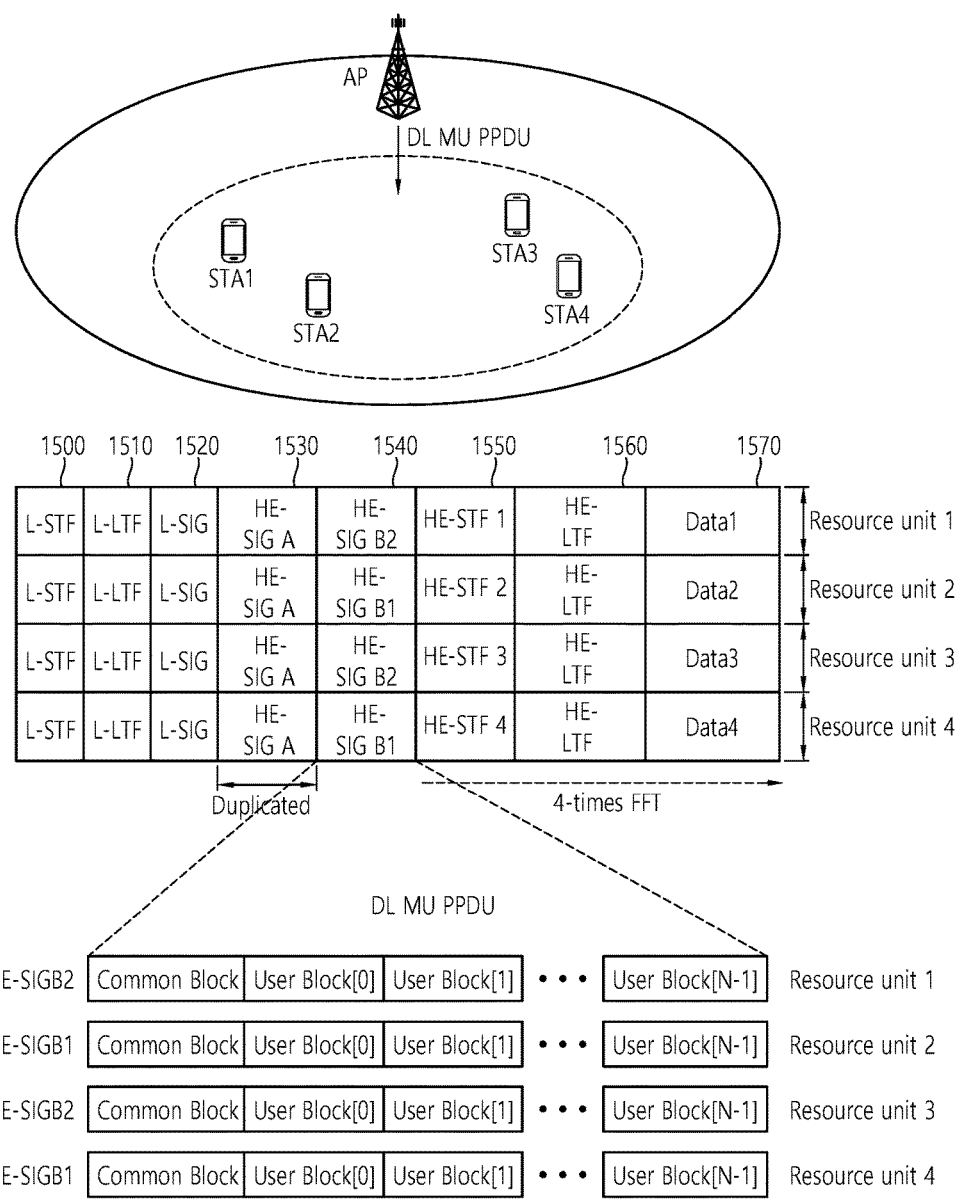
FIG. 15 is a conceptual view illustrating a DL MU PPDU format according to an exemplary embodiment of the present invention.

FIG. 15 is a conceptual view illustrating a DL MU PPDU format according to an exemplary embodiment of the present invention.

FIG. 15 discloses a DL U PPDU format that is transmitted by the AP based on OFDMA according to the exemplary embodiment of the present invention.

Referring to FIG. 15, a PPDU header of a DL MU PPDU may include a legacy-short training field (L-STF), a legacy-long training field (L-LTF), a legacy-signal (L-SIG), a high efficiency-signal A (HE-SIG A), a high efficiency-signal B (HE-SIG B), a high efficiency-short training field (HE-STF), a high efficiency-long training field (HE-LTF), and a data field (or MAC payload). The PPDU may be divided into a legacy part, which consists of a part starting from the PHY header to the L-SIG, and a high efficiency (HE) part, which consists of a part after the L-SIG.

The L-STF 1500 may include a short training orthogonal frequency division multiplexing (OFDM) symbol. The L-STF 1500 may be used for frame detection, automatic gain control (AGC), diversity detection, and coarse frequency/time synchronization.

The L-LTF 1510 may include a long training orthogonal frequency division multiplexing (OFDM) symbol. The L-LTF 1510 may be used for fine frequency/time synchronization and channel prediction.

The L-SIG 1520 may be used for transmitting control information. The L-SIG 1520 may include information on data transmission rate, data length, and so on.

The HE-SIG A 1530 may also include identification information for indicating a target STA that is to receive the DL MU PPDU. For example, the HE-SIG A 1530 may include an identifier indicating whether the transmitted PPDU is transmitted via DL transmission or UL transmission, an identifier of a specific STA (or AP) that is to receive the PPDU and information for indicating a group of specific STAs. Also, in case the DL MU PPDU is transmitted based on OFDMA or MIMO, the HE-SIG A 1530 may also include resource allocation information for the reception of the DL MU PPDU by the STA.

Additionally, the HE-SIG A 1530 may also include color bits information for BSS identification information, bandwidth information, transmission opportunity (TXOP) duration information, tail bit, CRC bit, modulation and coding scheme (MCS) information on the HE-SIG B 1540, information on the number of symbols for the HE-SIG B 1540, and cyclic prefix (CP) (or guard interval (GI)) length information.

Additionally, the HE-SIG A 1530 may have a repeat mode in order to extend the transmission range. In case the repeat mode is used in the HE-SIG A 1530, usage of the repeat mode before the HE-SIG A 1530 may be indicated. In the repeat mode, the HE-SIG A 1530 may be repeated once (or 1 time). A bit interleaver may be bypassed by a repeated HE-SIG A symbol.

The HE-SIG B 1540 may include information on a length modulation and coding scheme (MCS) of a physical layer service data unit (PSDU) for each STA and a tail bit, and so on. Additionally, the HE-SIG B 1540 may also include information on the STA that is to receive the PPDU and resource allocation information based on OFDMA (or MU-MIMO information). In case the resource allocation information based on OFDMA (or MU-MIMO information) is included in the HE-SIG B 1540, the resource allocation information may not be included in the HE-SIG A 1530.

The fields before the HE-SIG B 1540 within the DL MU PPDU may each be transmitted from different transmission resources in a duplicated format. In case of the HE-SIG B 1540, the HE-SIG B 1540 being transmitted from part of the resource units (e.g., resource unit 1 and resource unit 2) may correspond to an independent field including separate information, and the HE-SIG B 1540 being transmitted from the remaining resource units (e.g., resource unit 3 and resource unit 4) may correspond to a duplicated format of the HE-SIG B 1540, which is transmitted from another resource unit (e.g., resource unit 1 and resource unit 2).

More specifically, the HE-SIG B 1540 may include a common block and a plurality of user blocks. The common block may include information on the resource allocation, and the user block may include per STA specific information (or user specific information). A separate CRC may be defined for the common block, and separate CRCs may be respectively defined for each of a predetermined number of the plurality of user blocks. For example, a case when the HE-SIG B 1540 includes 1 common block and 5 user blocks (user block 1 to user block 5) and when a CRC for the user block is defined for each unit of 2 user blocks may be assumed herein. In this case, CRC1 for the common block, CRC2 for user block 1 and user block 2, CRC3 for user block 3 and user block 4, and CRC4 for user block 5 may be included in the HE-SIG B.

Each of the plurality of block included in the HE-SIG B 1540, which is transmitted from one resource unit, may include information on a plurality of users. For example, user block 1 may include user specific information corresponding to STA1 and STA2, and user block 2 may include user specific information corresponding to STA3 and STA4.

Each of HE SIG B1 being transmitted from resource unit 1 and HE SIG B2 being transmitted from resource unit 2 may correspond to a HE SIG B including different types of information. For example, HE SIG B1 being transmitted from resource unit 1 may include common blocks and user blocks correspond to each of STA1 and STA2, and HE SIG B2 being transmitted from resource unit 2 may include common blocks and user blocks correspond to each of STA3 and STA4. As described above, HE SIG B1 that is transmitted from resource unit 3 may be generated by duplicating HE SIG B1, which is transmitted from resource unit 1. And, HE SIG B2 that is transmitted from resource unit 4 may be generated by duplicating HE SIG B2, which is transmitted from resource unit 2.

The HE-STF 1550 may be used for enhancing automatic gain control estimation in a multiple input multiple output (MIMO) environment or an OFDMA environment.

More specifically, STA1 may receive HE-STF1, which is transmitted from the AP through resource unit 1 and may then perform synchronization, channel tracking/estimation, and AGC, thereby being capable of decoding data field 1 (or frame 1). Similarly. STA2 may receive HE-STF2, which is transmitted from the AP through resource unit 2 and may then perform synchronization, channel tracking/estimation, and AGC, thereby being capable of decoding data field 2 (or frame 2). STA3 may receive HE-STF3, which is transmitted from the AP through resource unit 3 and may then perform synchronization, channel tracking/estimation, and AGC, thereby being capable of decoding data field 3 (or frame 3). And, STA4 may receive HE-STF4, which is transmitted from the AP through resource unit 4 and may then perform synchronization, channel tracking/estimation, and AGC, thereby being capable of decoding data field 4 (or frame 4).

The HE-LTF 1560 may be used for estimating a channel in a MIMO environment or an OFDMA environment.

The inverse fast fourier transform (IFFT) size being applied to the HE-STF 1550 and the field after the HE-STF 1550 may be different from the IFFT size being applied to the field before the HE-STF 1550. For example, the IFFT size being applied to the HE-STF 1550 and the field after the HE-STF 1550 may be 4 times larger than the IFFT size being applied to the field before the HE-STF 1550. In case the STA may receive the HE-SIG A 1530 and may receive indication to receive a downlink PPDU based on the HE-SIG A 1530. In this case, the STA may perform decoding based on the HE-STF 1550 and the FFT size that is changed starting from the field after the HE-STF 1550. Conversely, in case the STA fails to receive indication to receive the downlink PPDU based on the HE-SIG A 1530, the STA may stop the decoding process and may perform network allocation vector (NAV) configuration. A cyclic prefix (CP) of the HE-STF 1550 may have a size that is larger than the CP of other fields, and, during such CP period, the STA may change the FFT size and may perform decoding on the downlink PPDU.

The access point (AP) may allocate each of the plurality of the resource units to each of the plurality of stations (STAs) within the entire bandwidth and may transmit individual data fields (or frames), which correspond to each of the plurality of STAs, to each of the plurality of STAs through each of the plurality of resource units. As described above, the information on the allocation of each of the plurality of resource units to each of the plurality of STAs may be included in the HE-SIG A 1550 or the HE-SIG B 1560.

Figure 16:
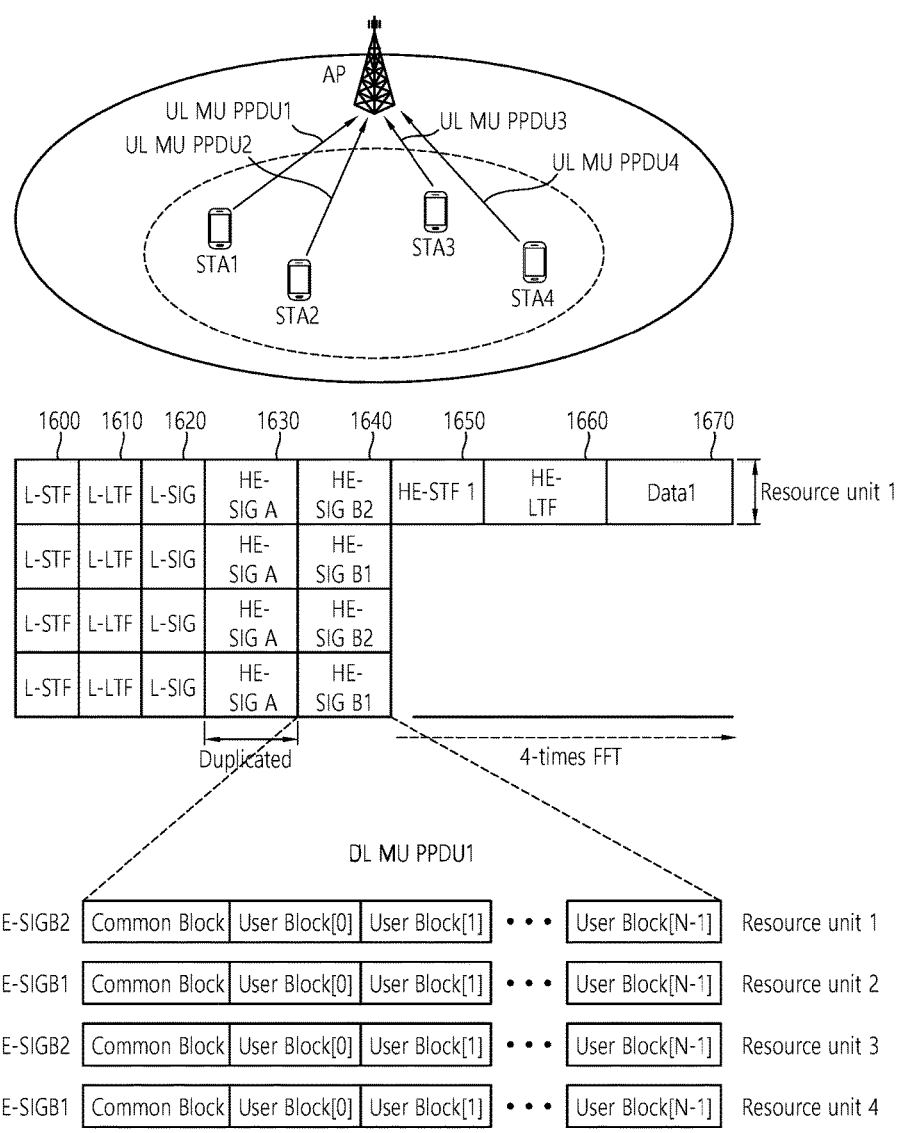
FIG. 16 is a conceptual view illustrating a transmission of a UL MU PPDU according to an exemplary embodiment of the present invention.

FIG. 16 is a conceptual view illustrating a transmission of a UL MU PPDU according to an exemplary embodiment of the present invention.

Referring to FIG. 16, a plurality of STAs may transmit a UL MU PPDU to the AP based on UL MU OFDMA.

The L-STF 1600, the L-LTF 1610, the L-SIG 1620, the HE-SIG A 1630, and the HE-SIG B 1640 may perform the functions, which are disclosed in FIG. 15. The information that is included in the signal field (L-SIG 1620, HE-SIG A 1630, and HE-SIG B 1640) may be generated based on the information included in the signal field of the received DL MU PPDU.

STA1 may perform uplink transmission through the entire bandwidth up to HE-SIG B 1640, and, then, STA1 may perform uplink transmission through the allocated bandwidth starting from HE-STF 1650. STA1 may deliver (or carry) an uplink frame through the allocated bandwidth (e.g., resource unit1) based on a UL MU PPDU. The AP may allocate an uplink resource corresponding to each of the plurality of STAs based on a DL MU PPDU (e.g., HE-SIG A/B), and each of the plurality of STAs may receive the corresponding uplink resource and then transmit a UL MU PPDU.

Figure 17:
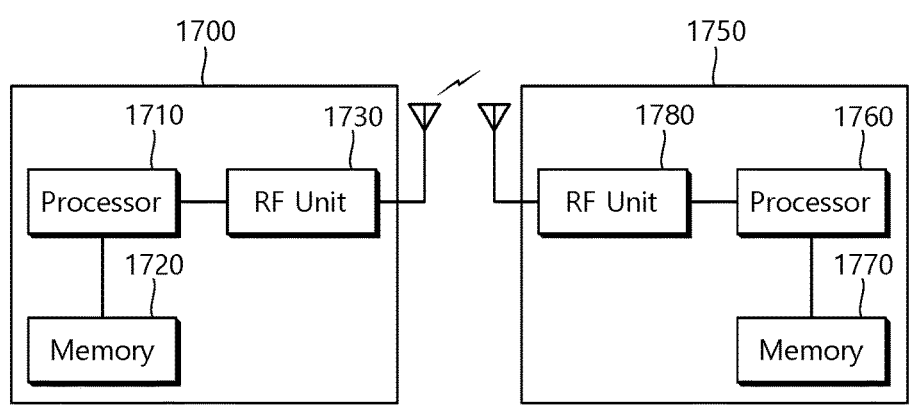
FIG. 17 is a block view illustrating a wireless device to which the exemplary embodiment of the present invention can be applied.

FIG. 17 is a block view illustrating a wireless device to which the exemplary embodiment of the present invention can be applied.

Referring to FIG. 17, as an STA that can implement the above-described exemplary embodiment, the wireless device may correspond to an AP 1700 or a non-AP station (STA) 1750.

The AP 1700 includes a processor 1710, a memory 1720, and a radio frequency (RF) unit 1730.

The RF unit 1730 is connected to the processor 1710, thereby being capable of transmitting and/or receiving radio signals.

The processor 1710 implements the functions, processes, and/or methods proposed in the present invention. For example, the processor 1710 may be implemented to perform the operations of the AP according to the above-described exemplary embodiments of the present invention. The processor may perform the operations of the AP, which are disclosed in the exemplary embodiments of FIG. 1 to FIG. 16.

For example, the processor 1710 may be configured to generate a PHY layer protocol data unit (PPDU) that is to be transmitted to a plurality of stations (STAs) and to transmit the generated PPDU to the plurality of STAs that is allocated within the entire frequency band.

A PPDU is transmitted from each of a plurality of resource unit groups being allocated to each of the plurality of STAs, and each of the plurality of resource unit groups may include a first resource unit group and a second resource unit group. The first resource unit group may include at least one resource unit, the second resource unit group may include one tone design resource unit, and the tone design resource unit may include at least one other resource unit and at least one additional tone unit. At least one additional tone unit may include leftover tones that remain after allocating the at least one resource unit and the at least one other resource unit within the entire bandwidth.

A number of the at least one additional tone unit may linearly increase in accordance with an increase in the number of the at least one other resource unit being included in the tone design resource unit. Alternatively, the number of the at least one additional tone unit may correspond to a fixed value that is independent from the increase in the number of the at least one other resource unit being included in the tone design resource unit.

The second resource unit group including the tone design resource unit may be allocated to one allocable location that is available for the resource allocation of the tone design resource unit, among a predetermined plurality of allocable locations that are available for the resource allocation of the tone design resource unit, and the plurality of allocatable locations for allocating the tone design resource unit may be determined based on the location of the at least one additional tone unit within the entire bandwidth.

The STA 1750 includes a processor 1760, a memory 1770, and a radio frequency (RF) unit 1780.

The RF unit 1780 is connected to the processor 1760, thereby being capable of transmitting and/or receiving radio signals.

The processor 1760 implements the functions, processes, and/or methods proposed in the present invention. For example, the processor 1760 may be implemented to perform the operations of the STA according to the above-described exemplary embodiments of the present invention. The processor may perform the operations of the STA, which are disclosed in the exemplary embodiments of FIG. 1 to FIG. 16.

For example, the processor 1760 may receive a PPDU that is transmitted from a first resource unit group including at least one resource unit, or the processor 1760 may receive a PPDU that is transmitted from a second resource unit group including one tone design resource unit.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1710 and 1760 through a diversity of well-known means.

What is claimed is:

1. A method for allocating resource units in a wireless local area network (WLAN), the method comprising:
   generating, by an access point (AP), a physical (PHY) layer protocol data unit (PPDU) for a plurality of stations (STAs); and
   transmitting, by the AP, the PPDU to the plurality of STAs based on a plurality of resource unit groups for an entire frequency bandwidth,
   wherein each of the plurality of resource unit groups is allocated to each of the plurality of STAs,
   wherein each of the plurality of resource unit groups corresponds to at least one 26-tone resource unit or a tone design resource unit that includes at least one other 26-tone resource unit and at least one additional tone unit, and
   wherein the at least one additional tone unit corresponds to leftover tones remaining after a plurality of frequency tones corresponding to the plurality of resource unit groups are divided in a 26-tone resource unit.

2. The method of claim 1, wherein a number of the at least one additional tone unit is linearly increased in accordance with an increase in a number of the at least one other 26-tone resource unit.

3. The method of claim 2, wherein a number of the at least one additional tone unit corresponds to a fixed value being independent from the increase in the number of the at least one other 26-tone resource unit.

4. The method of claim 1, wherein the tone design resource unit is located to one of a predetermined plurality of allocatable frequency locations within the entire frequency bandwidth, and
   wherein the predetermined plurality of allocatable frequency locations are determined based on a location of the at least one additional tone unit.

5. The method of claim 1, wherein the entire frequency bandwidth corresponds to 20 MHz,
   wherein the plurality of frequency tones correspond to a 242-tone resource unit, and
   wherein each of the at least one additional tone unit corresponds to a 4-tone leftover tone unit.

6. An access point (AP) allocating resource units in a wireless local area network (WLAN), the AP comprising:
   a radio frequency (RF) unit transmitting and receiving radio signals; and
   a processor being operatively connected to the RF unit, wherein the processor is configured:
   to generate a physical (PHY) layer protocol data unit (PPDU) for a plurality of stations (STAs), and
   to transmit the PPDU to the plurality of STAs based on a plurality of resource unit groups for an entire frequency bandwidth,
   wherein each of the plurality of resource unit groups is allocated to each of the plurality of STAs,
   wherein each of the plurality of resource unit groups corresponds to at least one 26-tone resource unit or a tone design resource unit that includes at least one other 26-tone resource unit and at least one additional tone unit, and
   wherein the at least one additional tone unit corresponds to leftover tones remaining after a plurality of frequency tones corresponding to the plurality of resource unit groups are divided in a 26-tone resource unit.

7. The AP of claim 6, wherein a number of the at least one additional tone unit is linearly increased in accordance with an increase in a number of the at least one other 26-tone resource unit.

8. The AP of claim 7, wherein a number of the at least one additional tone unit corresponds to a fixed value being independent from the increase in the number of the at least one other 26-tone resource unit.

9. The AP of claim 6, wherein the tone design resource unit is located to one of a predetermined plurality of allocatable frequency locations within the entire frequency bandwidth, and
   wherein the predetermined plurality of allocatable frequency locations are determined based on a location of the at least one additional tone unit.

10. The AP of claim 6, wherein the entire frequency bandwidth corresponds to 20 MHz,
    wherein the plurality of frequency tones correspond to a 242-tone resource unit, and
    wherein each of the at least one additional tone unit corresponds to a 4-tone leftover tone unit.

* * * * *